(12) United States Patent
Kobayashi et al.

(10) Patent No.: US 11,340,847 B2
(45) Date of Patent: May 24, 2022

(54) IMAGE FORMING SYSTEM, IMAGE FORMING APPARATUS, AND FEEDING APPARATUS

(71) Applicant: CANON KABUSHIKI KAISHA, Tokyo (JP)

(72) Inventors: Masaki Kobayashi, Shizuoka (JP); Takashi Yano, Shizuoka (JP); Hidehiro Ushiozu, Shizuoka (JP); Masato Suzuki, Shizuoka (JP); Kosuke Ogino, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/111,598

(22) Filed: Dec. 4, 2020

(65) Prior Publication Data

US 2021/0182000 A1  Jun. 17, 2021

(30) Foreign Application Priority Data

Dec. 11, 2019  (JP) .............................. JP2019-224024
Jun. 17, 2020  (JP) ................................. 2020-104674
Nov. 26, 2020  (JP) ............................. JP2020-196336

(51) Int. Cl.
  *G06F 3/12*  (2006.01)
  *B65H 7/00*  (2006.01)

(52) U.S. Cl.
  CPC .......... *G06F 3/1229* (2013.01); *G06F 3/1218* (2013.01); *G06F 3/1273* (2013.01);
  (Continued)

(58) Field of Classification Search
  CPC .... G06F 3/1229; G06F 3/1218; G06F 3/1273; B65H 2601/12; B65H 7/00; B65H 2557/23
  (Continued)

(56) References Cited

U.S. PATENT DOCUMENTS 4,270,860 A * 6/1981 Tsuda ...................... G03G 15/65
                                                                              399/78
2015/0205658 A1* 7/2015 Towata ................... G06F 11/30
                                                                             714/47.3

(Continued)

FOREIGN PATENT DOCUMENTS

JP  2007-199642 A  8/2007
JP  2018-100181 A  6/2018
JP  2019-018991 A  2/2019

*Primary Examiner* — Allen H Nguyen
(74) *Attorney, Agent, or Firm* — Carter, DeLuca & Farrell LLP

(57) ABSTRACT

An image forming apparatus comprises an accommodating unit that accommodates recording materials and a feeding unit that feeds an accommodated recording material, detects a fed recording material, and measures time from a predetermined timing until a recording material is detected. An information processing apparatus receives measured time data from the image forming apparatus, classifies the received plurality of time data into a first group and a second group in accordance with a length of time, selects a group for predicting a remaining life time of the feeding unit from the classified first group and second group, and predicts a remaining life time of the feeding unit using time data included in the selected group.

37 Claims, 31 Drawing Sheets

(52) U.S. Cl.
CPC ............ *B65H 7/00* (2013.01); *B65H 2557/23* (2013.01); *B65H 2601/12* (2013.01)

(58) Field of Classification Search
USPC ........................................................ 358/1.14
See application file for complete search history.

(56) References Cited

U.S. PATENT DOCUMENTS

| | | | |
|---|---|---|---|
| 2015/0222476 A1* | 8/2015 | Kondo | H04L 41/5061 709/223 |
| 2018/0127225 A1* | 5/2018 | Kodama | B65H 3/063 |
| 2019/0335049 A1* | 10/2019 | Kikuchi | H04N 1/00737 |
| 2021/0103413 A1* | 4/2021 | Martin | G06F 3/1207 |

\* cited by examiner

FIG. 23A

EXAMPLE OF NOTIFICATION BY TEXT STRING

| FEEDING ROLLER LIFE TIME L | TEXT STRING TO BE NOTIFIED |
|---|---|
| $80[\%] < L \leq 100[\%]$ | VERY GOOD |
| $60[\%] < L \leq 80[\%]$ | GOOD |
| $40[\%] < L \leq 60[\%]$ | USABLE |
| $20[\%] < L \leq 40[\%]$ | END OF LIFE WARNING |
| $0[\%] < L \leq 20[\%]$ | NEARLY AT END OF LIFE |
| $L=0 [\%]$ | NEEDS REPLACEMENT |

FIG. 23B

DETERMINATION CRITERIA FOR RELIABILITY

| SUBSET | REFERENCE | | RESULT |
|---|---|---|---|
| | IS DISTRIBUTION LESS THAN 1000 | IS NUMBER OF DATA 1000 OR MORE | IS RELIABILITY HIGH |
| DELAY SIDE DATA | No | Yes | No |
| EARLY ARRIVAL SIDE DATA | Yes | Yes | Yes |

F I G. 23C

DETERMINATION CRITERIA FOR TENDENCY CHANGE

| NUMBER OF SHEETS FED | AMOUNT OF CHANGE IN AVERAGE VALUE OF FEEDING TIME (MOST RECENT 30 MINUTES) | IS TENDENCY CHANGING |
|---|---|---|
| 0 | 0 | No |
| ... | ... | ... |
| 86516 | -5.01 | No |
| 86517 | 26.67 | Yes |
| ... | ... | ... |
| 280000 | -0.67 | No |

F I G. 23D

TABLE FOR CORRECTING FEEDING TIME DATA IN ACCORDANCE WITH AMOUNT OF RECORDING MATERIAL

| REMAINING AMOUNT R OF RECORDING MATERIAL | CORRECTION AMOUNT Z OF FEEDING TIME |
|---|---|
| $100[\%] \geq R \geq 40[\%]$ | 0ms |
| $39[\%] \geq R \geq 20[\%]$ | 2ms |
| $19[\%] \geq R \geq 10[\%]$ | 7ms |
| $9[\%] \geq R \geq 0[\%]$ | 14ms |

IMAGE FORMING SYSTEM, IMAGE FORMING APPARATUS, AND FEEDING APPARATUS

BACKGROUND OF THE INVENTION

Field of the Invention

The present invention relates to an image forming system, an image forming apparatus, and a feeding apparatus.

Description of the Related Art

An image forming apparatus such as a copy machine or a printer comprises an accommodating unit on which a recording material (sheet) is accommodated and a feeding mechanism that conveys a sheet that is accommodated on the accommodating unit. In the feeding mechanism, a configuration in which the accommodated sheets are fed one by one using a feeding roller by rotation of the feeding roller is common. Because the conveyance capability of the feeding roller decreases due to abrasion or deterioration of its surface through repeated conveyance of sheets and the adhesion of paper dust, the feeding roller is treated as a consumable and is replaced by a user or repair worker. Accordingly, a method is proposed in which the time it takes from the start of the rotation of the feeding roller until a sheet arrives at a sensor disposed downstream (hereinafter, feeding time) in a conveyance path is measured and if the rate of occurrence of conveyance delay (hereinafter, feeding delay) exceeds a predetermined threshold, it is notified that there is a need to replace the feeding roller (refer to Japanese Patent Laid-Open No. 2018-100181).

However, in the above conventional technique, the state of the feeding roller cannot be known until the rate of occurrence of the feeding delay exceeds a predetermined threshold. Accordingly, it is difficult to ascertain the replacement timing of the feeding roller at an early stage, to improve the usage environment of the feeding roller before the replacement timing is reached, and the like.

The purpose of the present invention is to provide a technique for predicting the remaining life time of a feeding unit based on the usage state of the feeding unit.

SUMMARY OF THE INVENTION

The present invention enables realization of predicting the remaining life time of a feeding unit based on the usage state of the feeding unit.

One aspect of the present invention provides an image forming system comprising: an information processing apparatus and an image forming apparatus, wherein the image forming apparatus comprises an accommodating unit configured to accommodate a recording material; a feeding unit configured to feed a recording material accommodated in the accommodating unit; a detection unit configured to detect a recording material fed by the feeding unit; and a measuring unit configured to measure time from a predetermined timing until the detection unit detects the recording material, and the information processing apparatus comprises a reception unit configured to receive time data obtained by the measuring unit from the image forming apparatus; a classification unit configured to classify a plurality of the time data received by the reception unit into a first group and a second group in accordance with a length of time; and a selection unit configured to select a group for predicting a remaining life time of the feeding unit from the first group and the second group that are classified by the classification unit; and a prediction unit configured to predict a remaining life time of the feeding unit using the time data included in the group selected by the selection unit.

Another aspect of the present invention provides an image forming apparatus, comprising: an accommodating unit configured to accommodate a recording material; a feeding unit configured to feed a recording material accommodated in the accommodating unit; a detection unit configured to detect a recording material fed by the feeding unit; a measuring unit configured to measure time from a predetermined timing until the detection unit detects the recording material; a classification unit configured to classify a plurality of the time data obtained by the measuring unit into a first group and a second group in accordance with a length of time; a selection unit configured to select a group for predicting a remaining life time of the feeding unit from the first group and the second group that are classified by the classification unit; and a prediction unit configured to predict a remaining life time of the feeding unit using the time data included in the group selected by the selection unit.

Another aspect of the present invention provides a feeding apparatus, comprising: an accommodating unit configured to accommodate a recording material; a feeding unit configured to feed a recording material accommodated in the accommodating unit; a detection unit configured to detect a recording material fed by the feeding unit; a measuring unit configured to measure time from a predetermined timing until the detection unit detects the recording material; an acquisition unit configured to divide a plurality of time data obtained by the measuring unit into two groups in accordance with a length of time and acquire from the plurality of time data included in a selected group among the two groups a reference time for determining a possibility that an abnormal state may occur when a recording material is fed by the feeding unit; and a determination unit configured to determine a possibility that the abnormal state may occur based on the reference time and the plurality of time data included in the selected group.

Still Another aspect of the present invention provides a feeding apparatus, comprising: an accommodating unit configured to accommodate a recording material; a feeding unit configured to feed a recording material accommodated in the accommodating unit; a detection unit configured to detect a recording material conveyed by the feeding unit; a driver unit configured to drive the feeding unit; a measuring unit configured to measure a driving amount by the driver unit from a predetermined timing until the detection unit detects a recording material; an acquisition unit configured to divide a plurality of driving amount data obtained by the measuring unit into two groups in accordance with a size of a driving amount and acquire from the plurality of driving amount data included in a selected group among the two groups a reference amount for determining a possibility that an abnormal state may occur when a recording material is fed by the feeding unit; and a determination unit configured to determine a possibility that the abnormal state may occur based on the reference amount and the plurality of driving amount data included in the selected group.

Further features of the present invention will become apparent from the following description of exemplary embodiments (with reference to the attached drawings).

BRIEF DESCRIPTION OF THE DRAWINGS

The accompanying drawings, which are incorporated into and constitute a part of the specification, illustrate embodiments of the invention and, together with the description, serve to explain the principles of the invention.

FIG. 23A to FIG. 23D are a view indicating an example of notification by text string and examples of determination criteria for reliability, determination criteria for tendency change, and a table for correcting feeding time data in accordance with the amount of recording materials.

DESCRIPTION OF THE EMBODIMENTS

Figure 1:
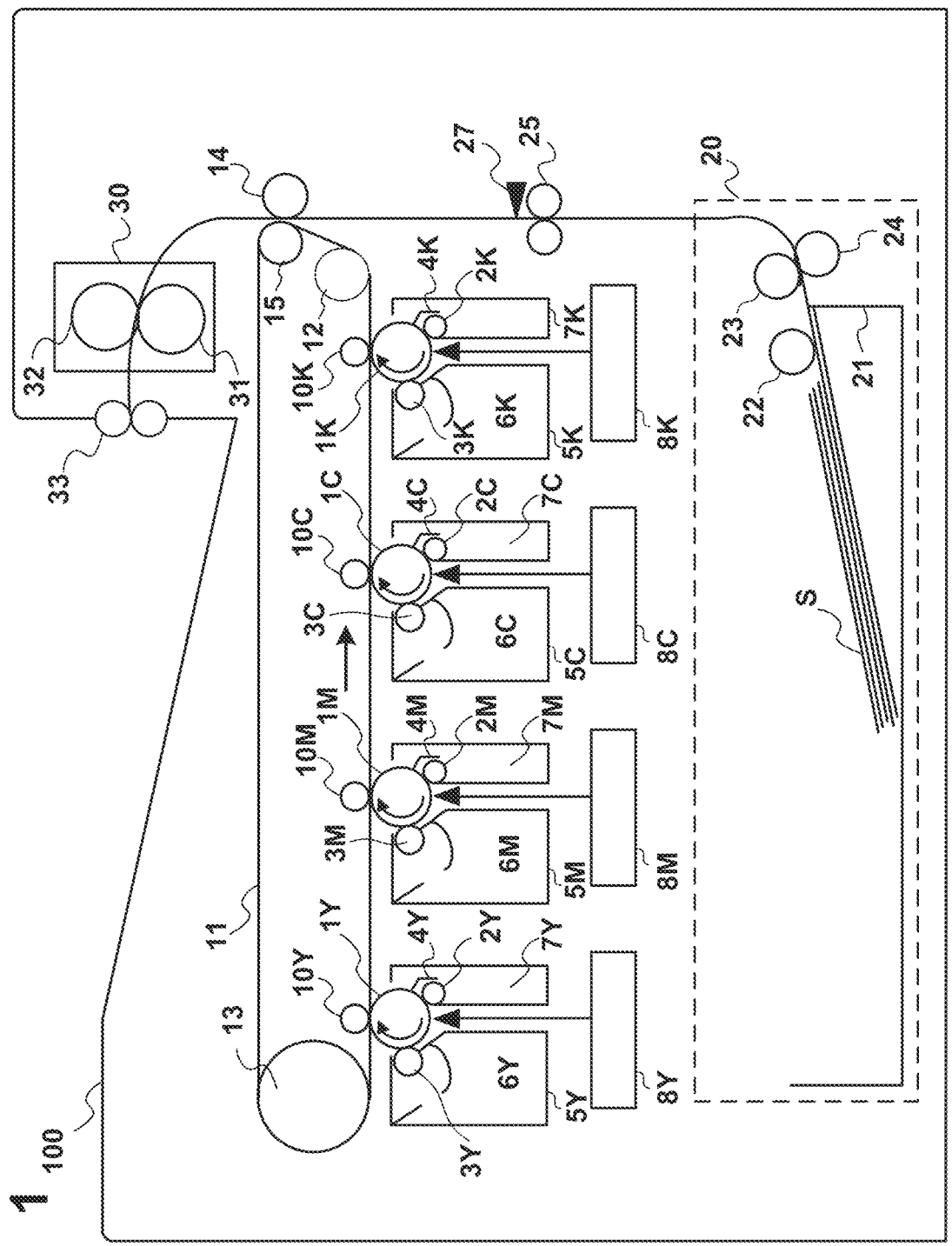
FIG. 1 is a schematic configuration diagram of an image forming apparatus in which a plurality of image forming units are arranged in parallel by adopting an intermediate transfer belt according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a schematic configuration diagram of an image forming apparatus 100 in which a plurality of image forming units are comprised in parallel by adopting an intermediate transfer belt according to a first embodiment.

The image forming apparatus 100 is a tandem color laser beam printer and can form (print) a color image by superimposing four colors of toners—yellow (Y), magenta (M), cyan (C), and black (K). In FIG. 1, a configuration of image forming units corresponding to each color is indicated by adding subscripts Y, M, C, and K to reference numbers. Note that in the following description, particularly in the description of members for which yellow, magenta, cyan, and black do not need to be distinguished, for the sake of descriptive convenience, the subscripts Y, M, C. and K of the reference numbers will be omitted.

Each process cartridge 5 has a toner container 6, a photosensitive drum 1 which is an image carrier, a charging roller 2, a developing roller 3, a drum cleaning blade 4, and a waste toner container 7. A laser unit 8 is disposed below the process cartridge 5, and the laser unit 8 performs exposure in relation to the photosensitive drum 1 based on an image signal. On the photosensitive drum 1, after the surface of the charging roller 2 is charged to a potential having a predetermined negative polarity by applying a voltage having a predetermined negative polarity to the charging roller 2, an electrostatic latent image that corresponds to each color is formed by the laser unit 8. A reversal development of this electrostatic latent image is performed by applying a voltage of a predetermined negative polarity to the developing roller 3, and Y, M, C, and K toner images are formed on their respective photosensitive drums 1. Note that the toner used in the first embodiment is negatively charged.

An intermediate transfer member unit has an intermediate transfer member 11, a drive roller 12, a tension roller 13, and an opposing roller 15. Also, a primary transfer roller 10 is disposed inside the intermediate transfer member 11 facing the photosensitive drum 1, and a transfer voltage is applied to the primary transfer roller 10 by a voltage application unit (not shown). A toner image that is formed on the photosensitive drum 1 is primary-transferred onto the intermediate transfer member 11 by rotating each photosensitive drum and the intermediate transfer member 11 in the direction of the arrow and then applying a positive voltage to the primary transfer roller 10. The toner images on the photosensitive drums 1 are primary-transferred onto the intermediate transfer member 11 in the order of Y, M, C, and K and then are conveyed to a secondary transfer roller 14 in a state in which the toner images of the four colors are overlapped.

A feeding mechanism 20 has a feeding roller 22 for feeding the recording material S from the inside of a feeding cassette (also called accommodation cassette) 21 on which the sheet-shaped recording material S is accommodated and accommodated, a conveyance roller 23 for conveying the fed recording material S. and a separation roller 24 for separating and conveying the recording material S one by one. Then, the recording material S that is conveyed from the feeding mechanism 20 is conveyed to the secondary transfer roller 14 by a registration roller pair 25. In order to transfer the toner image from the intermediate transfer member 11 to the recording material S, a voltage of positive polarity is applied to the secondary transfer roller 14. As a result, the toner image on the intermediate transfer member 11 is secondarily transferred onto the conveyed recording material S. Then, the recording material S to which the toner image is transferred is conveyed to a fixing device 30 and is heated and pressurized by a fixing film 31 and a pressure roller 32 of the fixing device 30, and the toner image is fixed to the surface of the recording material S. Then, the recording material S on which the image is fixed is discharged by a discharge roller pair 33.

At this time, the image forming apparatus determines whether or not conveyance failure such as an early arrival, a delay, or a jam of the recording material has occurred by using a conveyance path sensor 27. In a case where it is determined that conveyance failure has occurred, display for notifying that conveyance failure has occurred in the display unit (not shown) is performed. Also, a method for resolving conveyance failure and the like is displayed as necessary.

Next, the feeding mechanism 20 according to the first embodiment will be described in detail with reference to FIG. 2A to FIG. 2C.

Figure 2A:
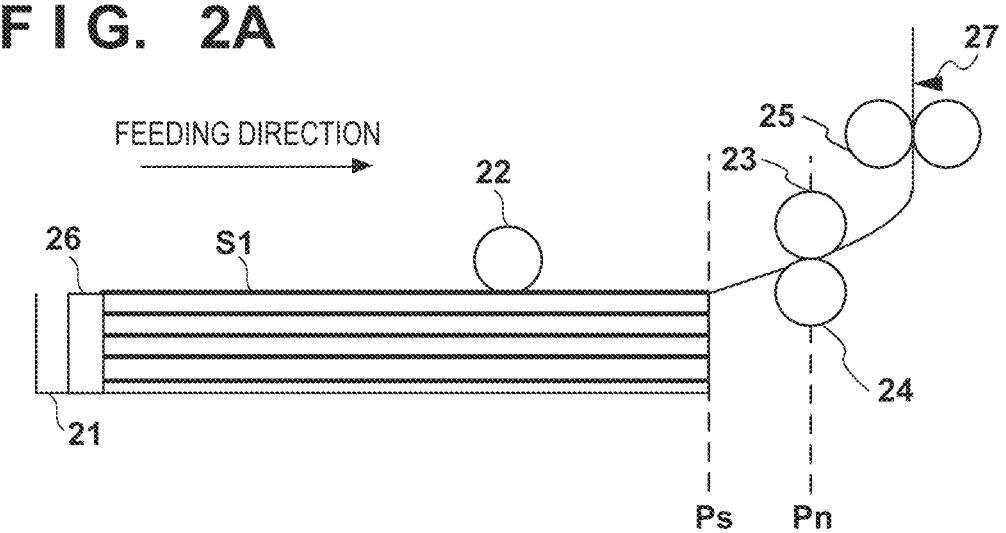
FIG. 2A to FIG. 2C are a schematic cross-sectional view describing a feeding operation in the image forming apparatus according to the first embodiment.
Figure 2B:
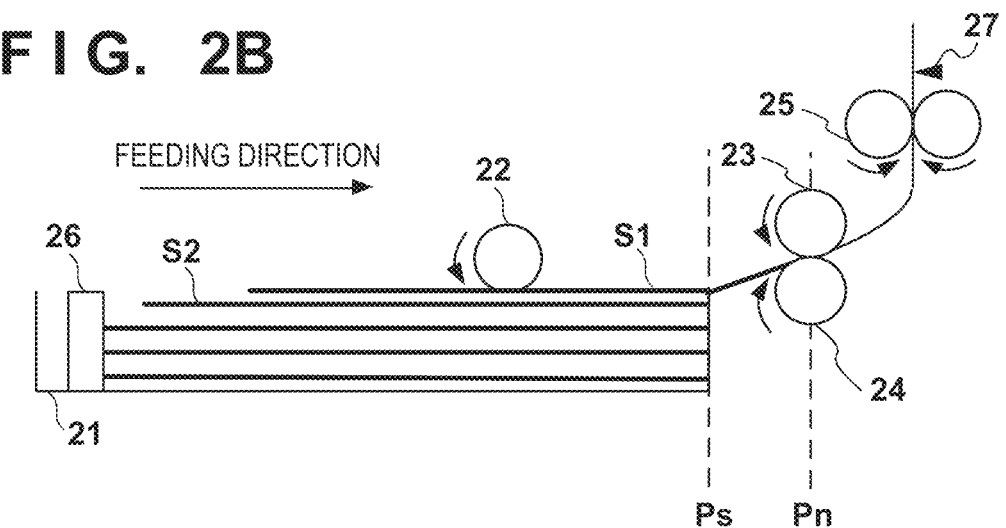
Figure 2C:
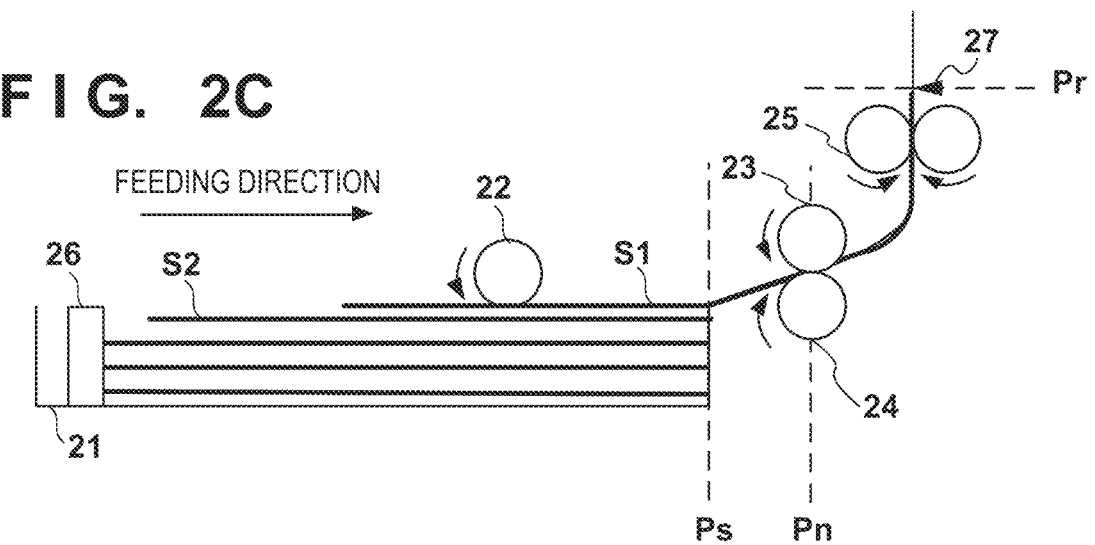

FIG. 2A to FIG. 2C are a schematic cross-sectional view describing a feeding operation in the image forming apparatus 100 according to the first embodiment.

FIG. 2A is a cross-sectional view of the feeding mechanism at a timing when a recording material S1 that is accommodated in the feeding cassette 21 and positioned at the top is fed. The recording material S1 within the feeding cassette 21 is positioned by a trailing edge regulating plate 26 within the feeding cassette 21, and the leading edge when the recording material S1 is fed is at a position that is indicated by Ps. When a feeding operation is started, the feeding roller 22 and the conveyance roller 23 each rotate, and the recording material S1 starts to move in the rightward direction (feeding direction) in FIG. 2A by the friction between the feeding roller 22 and the recording material S1. Then, the recording material S1 reaches a separation nip Pn formed by the conveyance roller 23 and the separation roller 24.

At this time, as illustrated in FIG. 2B, frictional force also occurs between recording materials S1 and S2, and the recording material S2 may also move. This separation nip Pn, when two or more recording materials S1 and S2 are conveyed to the separation nip Pn by the rotation of the feeding roller 22, has a function of separating the recording material S2 and then sending only one recording material S1 downstream. A torque limiter (not shown) is connected to the separation roller 24, and torque as a resistance force is applied in a direction opposite to the conveyance direction of the recording material S1. This torque is set so that when there is only one recording material S in the separation nip Pn, the separation roller 24 rotates following the conveyance roller 23, but when two recording materials S enter the separation nip Pn, the separation roller 24 stops. Accordingly, recording materials can be conveyed downstream one by one by the separation nip Pn.

Then, when the feeding roller 22 and the conveyance roller 23 further continue to rotate, the recording material S1 passes through the registration roller pair 25, and the leading edge of the recording material S1 reaches a position Pr where the leading edge is detected by the conveyance path sensor 27 as illustrated in FIG. 2C. The time from the start of the feeding operation until the recording material S1 reaches the conveyance path sensor 27 is feeding time.

Figure 3:
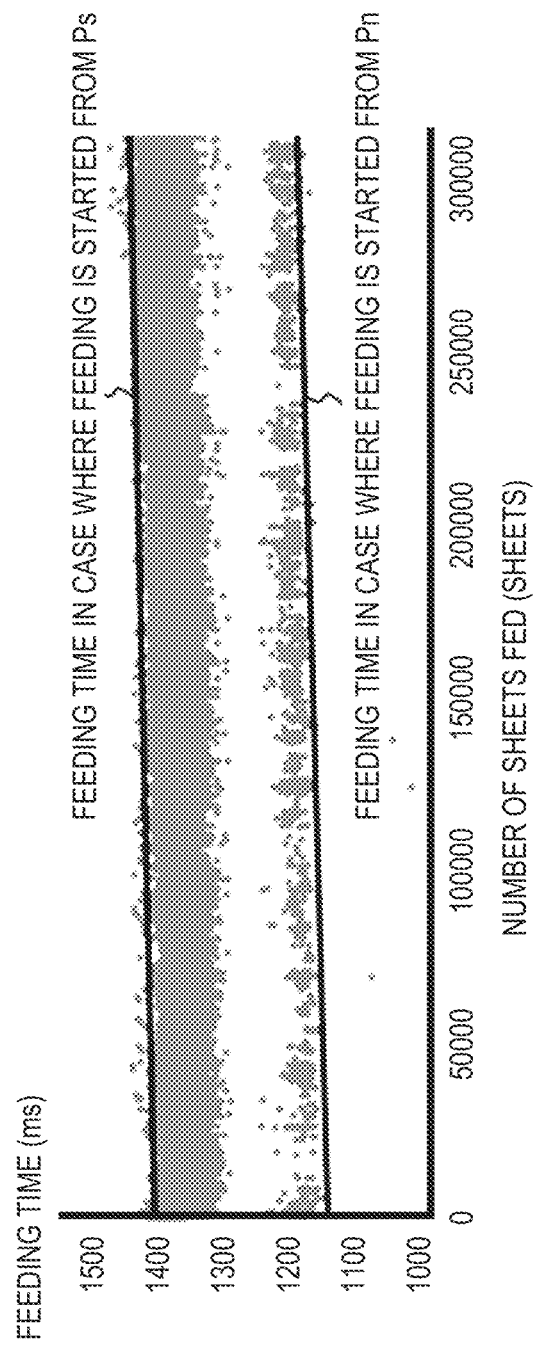
FIG. 3 is a view indicating an example of the transition of feeding time when the feeding operation of a recording material S is repeated in a conveyance mechanism as illustrated in FIG. 2A to FIG. 2C.

FIG. 3 is a view indicating an example of the transition of feeding time when the feeding operation of a recording material S is repeated in a conveyance mechanism as illustrated in FIG. 2A to FIG. 2C.

As indicated in FIG. 3, when the feeding operation of the recording material S is repeated, the feeding time tends to lengthen in general. This is because, by repeating the feeding operation of the recording material, the feeding roller 22 is abraded and the frictional force between the feeding roller 22 and the recording material decreases. As described above, when feeding is started from the separation nip Pn, the feeding time is shorter, and when feeding is started from the position Ps of the leading edge of the recording material in the feeding cassette 21, the feeding time is longer.

Figure 4:
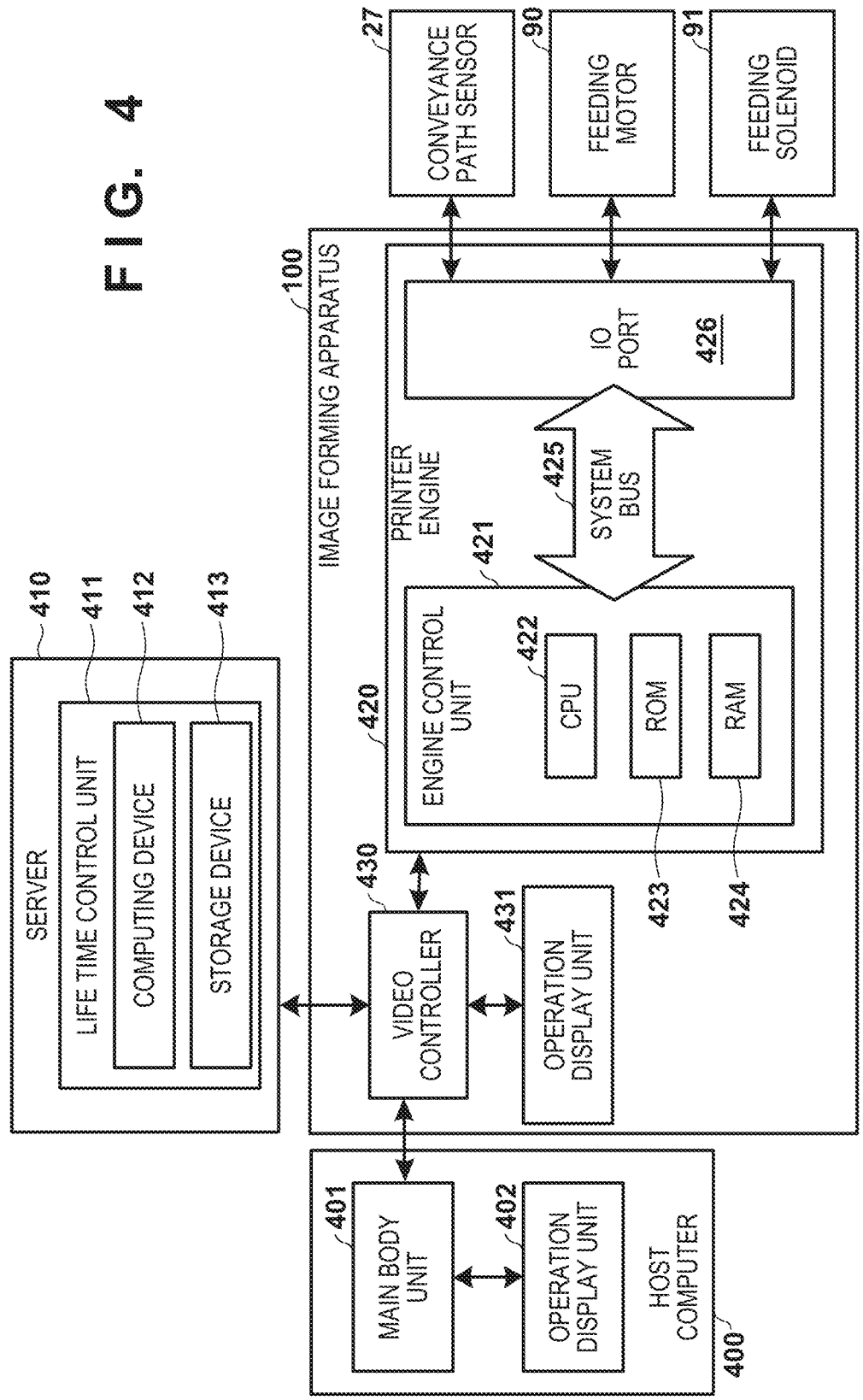
FIG. 4 is a block diagram describing a hardware configuration of the image forming apparatus and a configuration of an image forming system that includes the image forming apparatus according to the first embodiment.

FIG. 4 is a block diagram describing a hardware configuration of the image forming apparatus 100 and a configuration of an image forming system that includes the image forming apparatus 100 according to the first embodiment. This system includes a host computer 40, the image forming apparatus 100, and a server (information processing apparatus) 410. The host computer 400 has a main body unit 401 for instructing the image forming apparatus 100 to print via a network and an operation display unit 402 for accepting an operation of the user and performing display that is related to the user. Here, the operation display unit 402 that the host computer 400 has includes a display having a touch panel function, a keyboard, a pointing device, and the like, which are not shown.

The image forming apparatus 100 has a video controller 430, an operation display unit 431, and a printer engine 420. The operation display unit 431 that the image forming apparatus 100 has includes an operation panel, an operation button, and the like, which are not shown. The video controller 430 transmits print data and a print instruction that were transmitted from the host computer 400 to the printer engine 420. The printer engine 420 has an engine control unit 421 including a CPU 422, a ROM 423, and a RAM 424, a system bus 425, and an IO port 426. The CPU 422 executes a program by deploying the program and various data stored in the ROM 423 in the RAM 424 and using the RAM 424 as a work area. The configuration elements described above can access the IO port 426 via the system bus 425 which enables access in both directions. The conveyance path sensor 27, a feeding motor 90, a feeding solenoid 91, and the like are connected to the IO port 426. The CPU 422 controls these devices via the IO port 426. Note that the devices connected to the IO port 426 are not limited to the configuration in the first embodiment.

A server 410 has a life time control unit 411 including a computing device 412 and a storage device 413 and is connected to the image forming apparatus 100 via a network that enables communication in both directions. The computing device 412 executes a program stored in the storage device 413 and performs reading and writing of various data. The computing device 412 may directly allocate a RAM, an HDD, an SSD, or the like to the CPU, the GPU, and the storage device 413 or may allocate a virtual environment such as a virtual machine. The life time control unit 411 can perform transmission and reception of information with the engine control unit 421 via the video controller 430.

Next, functions of the engine control unit 421 and the life time control unit 411 according to the first embodiment will be described with reference to FIG. 5. Note that the functions of the engine control unit 421 are realized by the CPU 422 executing a program deployed in the RAM 424. Also, the functions of the life time control unit 411 are realized by the computing device 412 of the server 410 executing a program stored in the storage device 413. The engine control unit 421 has a function related to feeding control and a function related to measuring of the feeding time, and the life time control unit 411 has a function related to the prediction of the remaining life time (sometimes abbreviated simply as "life time") of the feeding mechanism. Each will be described in order.

Figure 5:
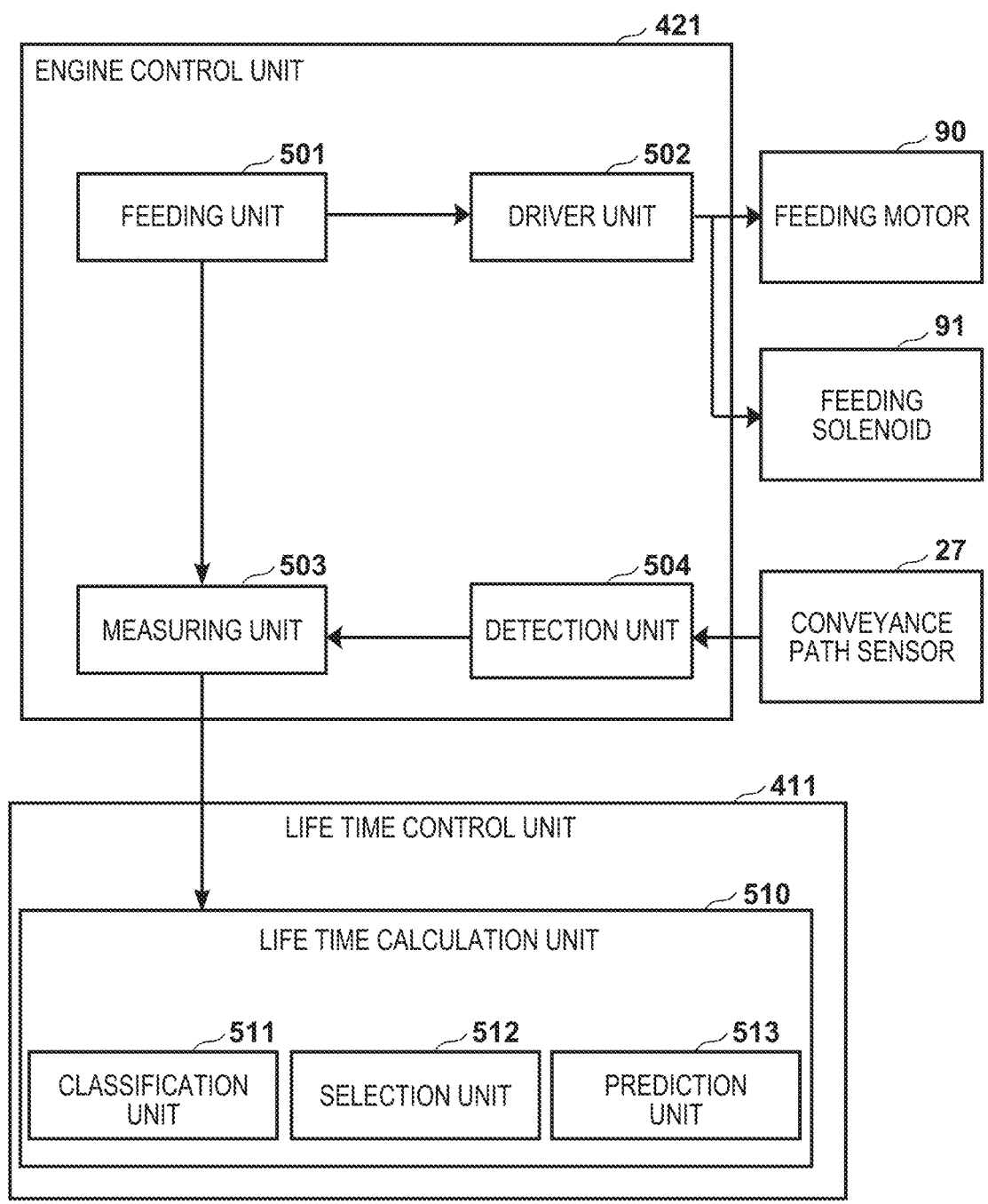
FIG. 5 is a functional block diagram describing the functions of an engine control unit and a life time control unit according to the first embodiment.

FIG. 5 is a functional block diagram for describing functions of the engine control unit 421 and the life time control unit 411 according to the first embodiment.

The engine control unit 421 has a feeding unit 501 and a driver unit 502 as functions related to the feeding control. When the printer engine 420 receives a print instruction, the feeding unit 501 instructs the driver unit 502 to perform a feeding operation. The driver unit 502, in accordance with the instruction of the feeding unit 501, rotates the conveyance roller 23 and the separation roller 24 by rotationally driving the feeding motor 90. Furthermore, at the timing of the start of feeding, by driving the feeding solenoid 91, the feeding roller 22 is made to perform one rotation. By this operation, the recording materials S that were pushed up in the feeding cassette 21 are separated, fed one by one, and then conveyed to the conveyance path sensor 27.

Next, the engine control unit 421 has a measuring unit 503 and a detection unit 504 as functions related to measuring of the feeding time. The measuring unit 503 measures the time from a timing when the feeding unit 501 instructs a feeding operation until the leading edge of the recording material S reaches the conveyance path sensor 27. This measuring is performed every time one sheet of the recording material S is fed, and the measured time is stored in the RAM 424 as feeding time data. The measuring unit 503 uses, for example, a timer incorporated in the CPU 422 as a measuring unit for measuring time. The feeding time data stored in the RAM 424 is also stored in the storage device 413 of the life time control unit 411 via the video controller 430. The detection unit 504, based on an input signal from the conveyance path sensor 27, detects that the leading edge of the recording material S has reached the conveyance path sensor 27.

The life time control unit 411 has a life time calculation unit 510 as a function related to the prediction of the life time of the feeding mechanism. The life time calculation unit 510 has a classification unit 511, a selection unit 512, and a prediction unit 513. The classification unit 511 classifies feeding time data set that is stored in the storage device 413 into a plurality of subsets based on a predetermined reference. In the first embodiment, the feeding time data set is classified into a delay side data set and an early arrival side data set as indicated in FIG. 6.

Figure 6:
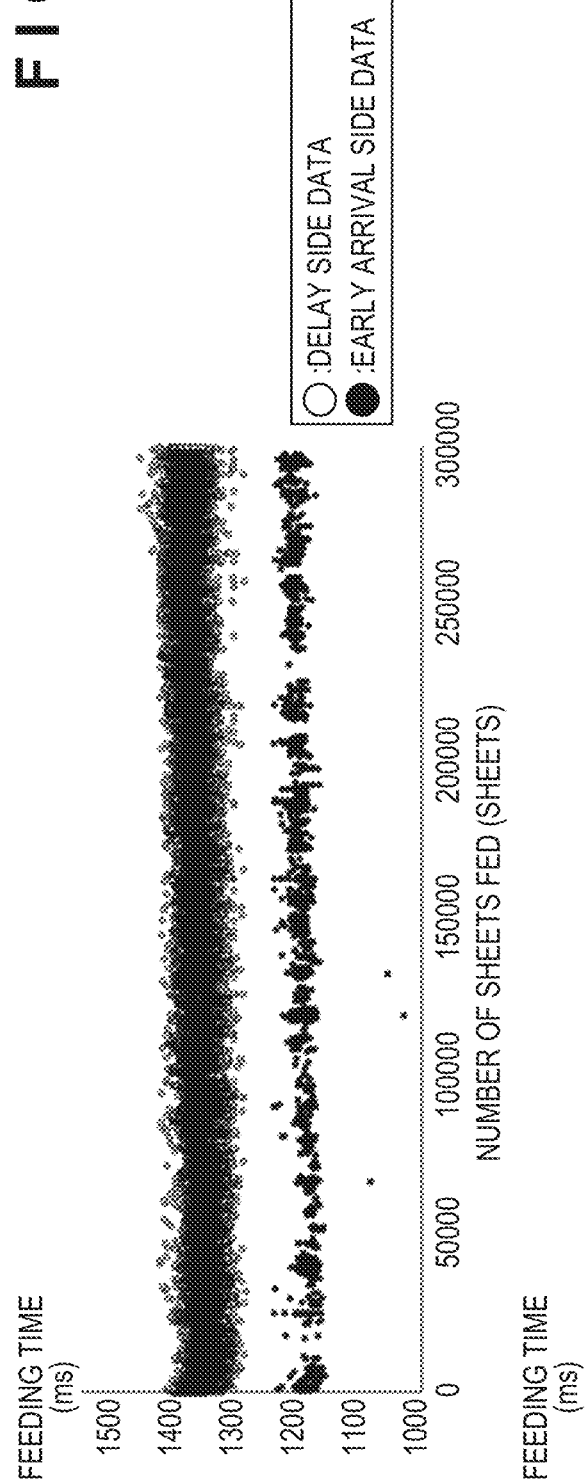
FIG. 6 is a view indicating an example of the number of sheets fed and feeding time in the first embodiment.

FIG. 6 is a view indicating an example of the number of sheets fed and feeding time in the first embodiment.

In the first embodiment, feeding time that is equal to or greater than 1250 ms is the delay side data and feeding time that is less than 1250 ms is the early arrival side data.

The selection unit 512 selects from the subsets that were classified by the classification unit 511 a subset to use for calculating the remaining life time of the feeding mechanism. In the first embodiment, the delay side data set is selected. Then, the prediction unit 513, based on the subset selected by the selection unit 512, predicts a feeding time profile PF which represents the transition of feeding time in accordance with the number of sheets fed. Generally, feeding time increases as the feeding roller is abraded; therefore, it is possible to predict the remaining life time of the feeding roller from the change in feeding time.

Figure 7:
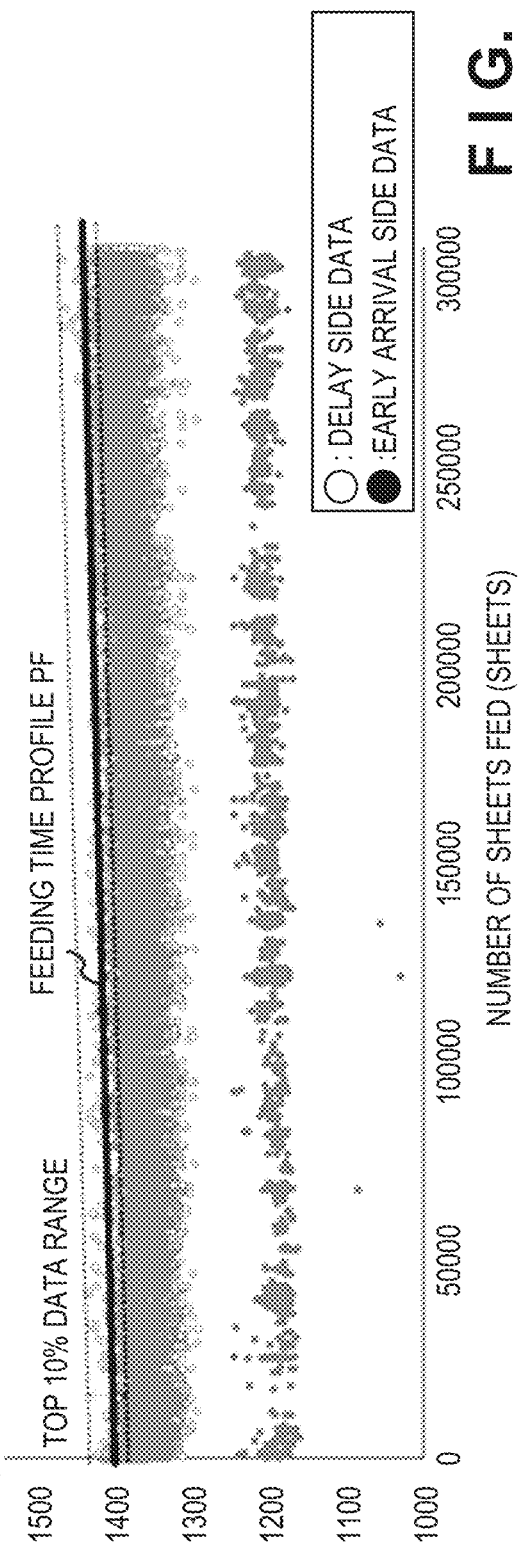
FIG. 7 is a graph view indicating a feeding time profile in the first embodiment.

FIG. 7 is a graph view indicating a feeding time profile in the first embodiment.

In the first embodiment, as indicated in FIG. 7, the feeding time profile PF is acquired by extracting the top 10% of data from the delay side data set and then applying the result to a linear regression model. The feeding time profile PF in the first embodiment is a prediction of the feeding time when feeding is started from Ps and is represented by a linear function as indicated in Expression (1) when x is the number of sheets fed, t is the feeding time, $\alpha$ is the slope, and $\beta$ is the intercept.

$$PF: t = \alpha x + \beta \quad \text{Expression (1)}$$

In this Expression (1), $\alpha$ and $\beta$ are parameters that are decided by being applied to the linear regression model, and in FIG. 6, $\alpha = 70/300000$ and $\beta = 1380$. By using this feeding time profile PF, it becomes possible to predict the transition of feeding time in accordance with the number of sheets fed.

The life time calculation unit 510 acquires a remaining life time L of the feeding roller 22 using Expression (2)

based on the maximum feeding time Ts in a case where feeding is started from Ps and feeding time t that is acquired by the feeding time profile PF. Then, the acquired remaining life time L of the feeding roller is notified to the video controller 430.

$$L(\%) = \left(1 - \frac{t}{Ts}\right) \times 100 \qquad \text{Expression (2)}$$

Note that in the first embodiment, the unit of feeding time t is milliseconds, the unit of the number of sheets fed x is sheets, and the unit of remaining life time L of the feeding roller is percentage. Also, in the first embodiment, Ts=1500 ms which the maximum time that is preset in which conveyance can be performed in a case where feeding is started from Ps.

Next, the operations of the engine control unit 421 and the life time control unit 411 in the first embodiment will be described with reference to the flowchart in FIG. 8.

Figure 8:
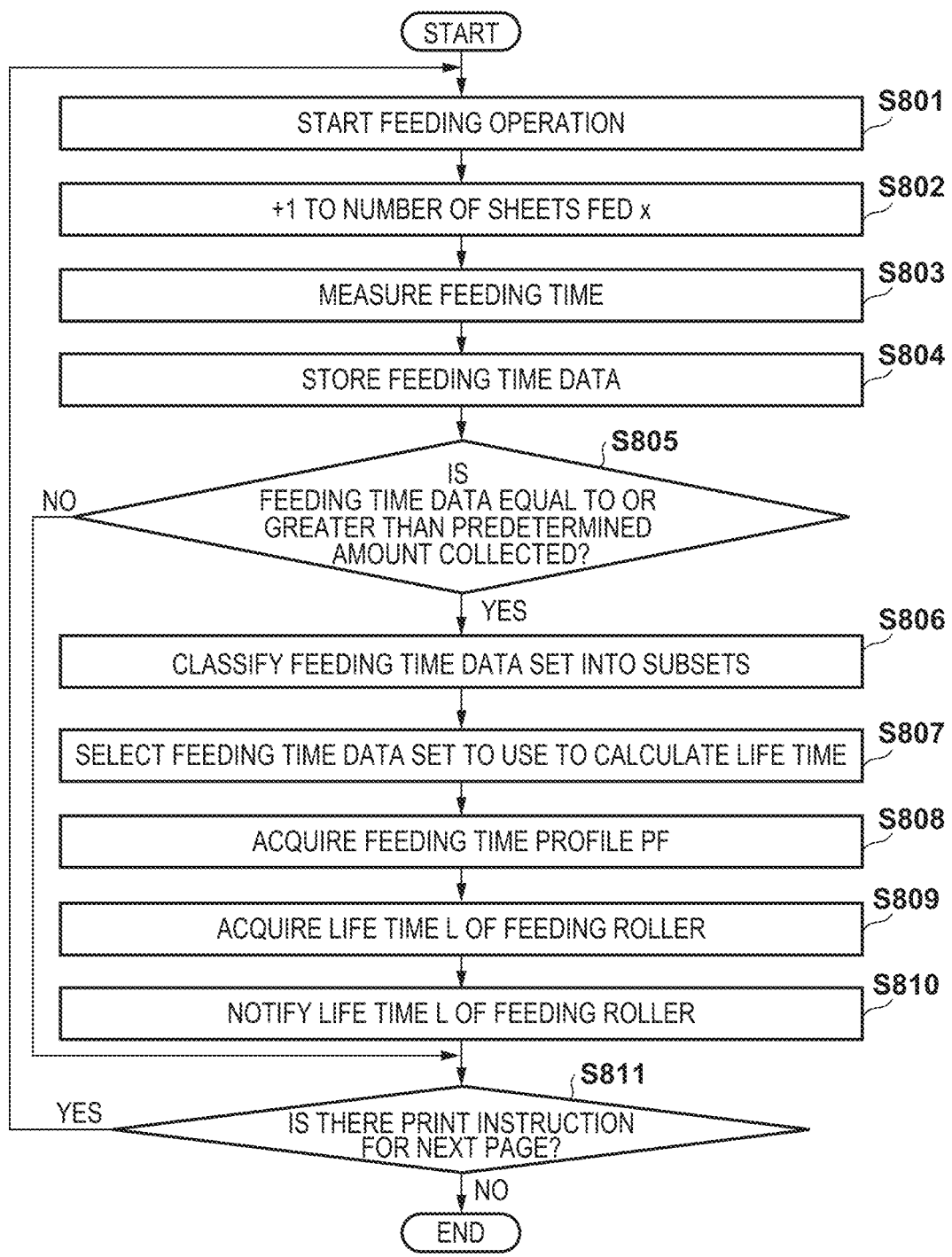
FIG. 8 is a flowchart describing processing for obtaining the remaining life time of a feeding roller in the image forming apparatus according to the first embodiment.

FIG. 8 is a flowchart describing processing for obtaining the remaining life time of the feeding roller 22 in the image forming apparatus 100 according to the first embodiment. Note that the processing indicated in this flowchart is realized by the CPU 422 executing a program deployed in the RAM 424 and working together with a server control unit (a control unit (for example, life time control unit 411) of the server 410).

This processing is started by the printer engine 420 receiving a print instruction, and first in step S801, the CPU 422 starts the feeding operation by the feeding unit 501 and the driver unit 502 and then starts the conveyance of the recording material S. Next, the processing proceeds to step S802 in which the CPU 422 increments the number of sheets fed x (variable provided in the RAM 424) by 1. Next, the processing proceeds to step S803 in which the CPU 422 performs measuring of the feeding time by the measuring unit 503 and the detection unit 504. In other words, based on the input signal from the conveyance path sensor 27, the CPU 422 obtains the time when the leading edge of the recording material S reached the conveyance path sensor 27 and acquires the feeding time data by subtracting from that time the time when the feeding operation was started. The CPU 422 transmits the acquired feeding time data to the server control unit. Then the processing proceeds to step S804 in which the computing device 412 stores the received feeding time data in the storage device 413.

Next, the processing proceeds to step S805 in which the computing device 412 functions as the life time calculation unit 510 to determine whether or not the feeding time data set that was stored in step S804 is equal to or greater than a predetermined amount and if it is not equal to or greater than a predetermined amount, the processing proceeds to step S811 and if it is equal to or greater than a predetermined amount, the processing proceeds to step S806 in which the computing device 412 functions as the classification unit 511 to classify the feeding time data set stored in the RAM 424 into the delay side data set and the early arrival side data set. Then, the processing proceeds to step S807 in which the computing device 412 functions as the selection unit 512 and as described above with reference to FIG. 6, selects the feeding time data set to be used for predicting remaining life time of the feeding roller. Note that the predetermined amount in the first embodiment is data in which the number of sheets fed is 500 sheets and the feeding time data set to be selected is the delay side data set.

Then, the processing proceeds to step S808 in which the computing device 412 functions as the prediction unit 513 and acquires the feeding time profile PF. For example, the following Expression (3) is an expression that indicates the acquired feeding time profile PF in relation to the feeding time data set indicated in FIG. 6. Here, x indicates the number of sheets fed.

$$PF: t = x\left(\frac{70}{300000}\right) + 1380 \qquad \text{Expression (3)}$$

Next, the processing proceeds to step S809 in which the computing device 412 functions as the life time calculation unit 510 and acquires the remaining life time L of the feeding roller based on the feeding time profile PF and the maximum feeding time Ts=1500 ms in a case where feeding is started from the position Ps. In the first embodiment, the remaining life time L of the feeding roller is acquired using the feeding time t that was acquired using Expression (3) and the following Expression (4).

$$L = \left(1 - \frac{t}{1500}\right) \times 100 \qquad \text{Expression (4)}$$

For example, because the feeding time t when the number of sheets fed=300000 is t=1450, the remaining life time L of the feeding roller is L=3.33%.

Next, the processing proceeds to step S810 in which the computing device 412 notifies to the video controller 430 the remaining life time L of the feeding roller which was acquired in step S809. The remaining life time L of the feeding roller is notified to the host computer 400 and a printer management tool (not shown) as necessary by determination of the video controller 430. Then, finally, in step S811, the CPU 422 determines whether or not there is a print instruction for the next page and if there is a print instruction for the next page, returns again to start the feeding operation in step S801 and if not, ends the processing.

Note that in the first embodiment, although a case in which there is one feeding mechanism is indicated, the present invention may be applied to a configuration in ich there is a plurality of feeding mechanisms. In a case where there is a plurality of feeding mechanisms, operations of the engine control unit 421 and the life time control unit 411 are conducted separately for each feeding mechanism, and as a result, the remaining life times L of the feeding rollers are acquired separately for each feeding mechanism.

As described above, according to the first embodiment, by accurately predicting the remaining life time of the feeding roller, it becomes possible to ascertain the replacement timing of the feeding roller at an early stage. Also, because it is possible to know where the feeding roller is in its life before the replacement timing of the feeding roller is reached, it becomes possible to improve the usage state such as changing the type of recording material before the replacement timing of the feeding roller.

Note that the present invention is not limited to the first embodiment. For example, a configuration may be taken so that the printer engine 420 has the function of the life time control unit 411 of the server 410. Also, a clustering method such as a Gaussian mixture model or a K-means clustering may be used as a method for classifying the feeding time data set by the classification unit 511. Furthermore, a fitting method based on a neural network, higher-order polynomial approximation, and the like may be used for the acquisition of the feeding time profile PF by the prediction unit 513.

Also, in the first embodiment, although the unit of the remaining life time of the feeding roller 22 is percentage, it may be indicated by the unit of the number of sheets fed. Also, the notification of the remaining life time L of the feeding roller, as indicated in FIG. 23A, for example, may be notification of a text string in accordance with the value of the remaining life time L of the feeding roller. FIG. 23A indicates an example of text strings to be notified in correspondence with the remaining life time L of the feeding roller.

Second Embodiment

In the second embodiment, description will be given for an example in which the selection unit 512 selects a subset whose data reliability is high when selecting a subset to be used in the acquisition of remaining life time of the feeding mechanism from subsets that were classified by the classification unit 511. Because the hardware configuration, the system configuration, and the like of the image forming apparatus according to the second embodiment are the same as in the first embodiment described above, only parts that are different from the first embodiment will be described in the second embodiment.

As described above, in the first embodiment, the selection unit 512 selected the delay side data set from the subsets that were classified by the classification unit 511. However, it may not always be appropriate to select the delay side data set depending on the characteristics of the recording material or the configuration of the feeding cassette and the like. For example, assume that a subset as indicated in FIG. 9 was acquired as a result of the classification by the classification unit 511.

Figure 9:
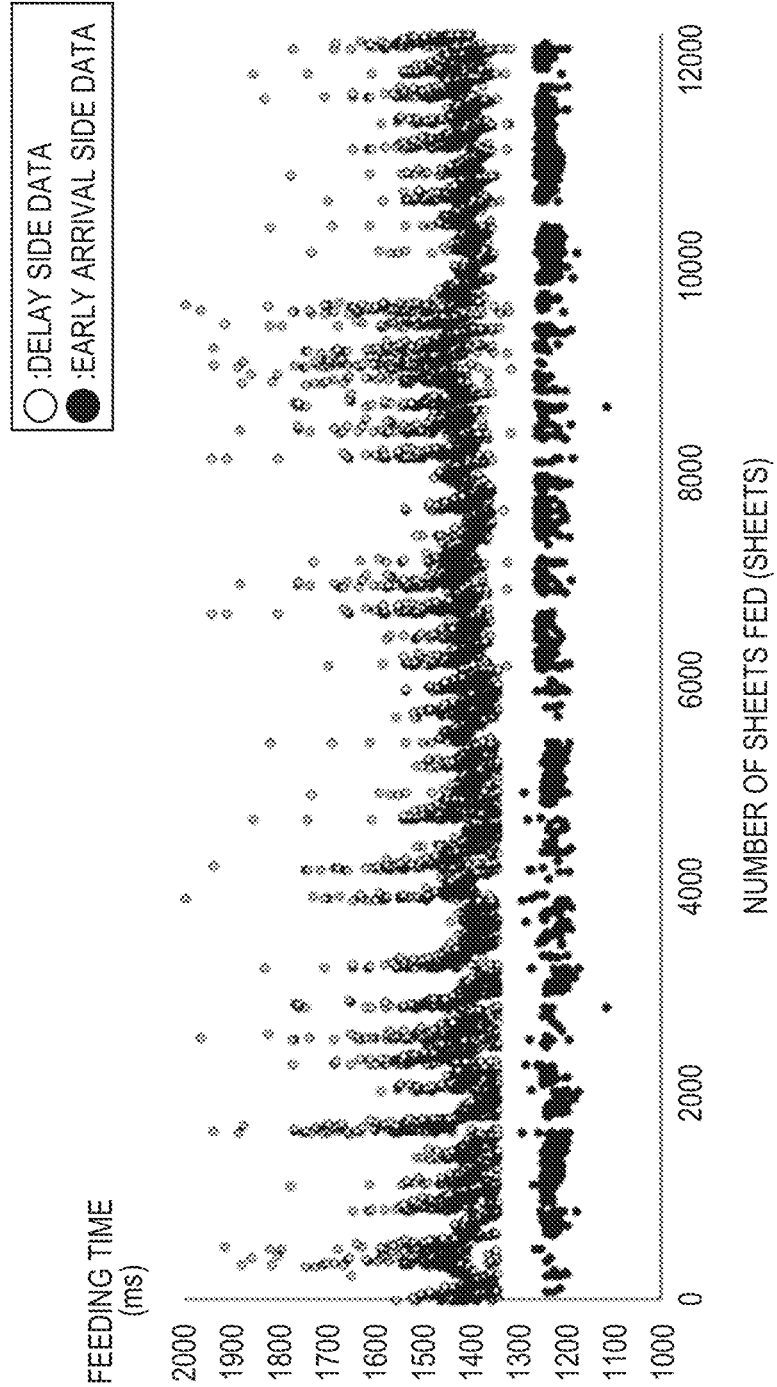
FIG. 9 is a graph view indicating a feeding time set in a second embodiment.

FIG. 9 is a graph view indicating the set of feeding times in the second embodiment.

In the example in FIG. 9, the delay side data set whose feeding time is equal to or greater than 1250 ms is greatly scattered, and if this delay side data set is used to predict the feeding time profile PF, there is a possibility that error may increase. Such a data set that is greatly scattered can be treated as a data set whose reliability is low. Meanwhile, the early arrival side data set whose feeding time is less than 1250 ms is less scattered in comparison to the delay side data set and can be treated as a data set whose reliability is high.

In view of such a situation, the life time calculation unit 510 has a reliability determination unit 1001 in the second embodiment. The reliability determination unit 1001 determines the reliability of each subset that was classified by the classification unit 511 in accordance with a predetermined determination criteria for determining reliability. The selection unit 512 selects a subset whose reliability is determined to be high by the reliability determination unit 1001.

Figure 10:
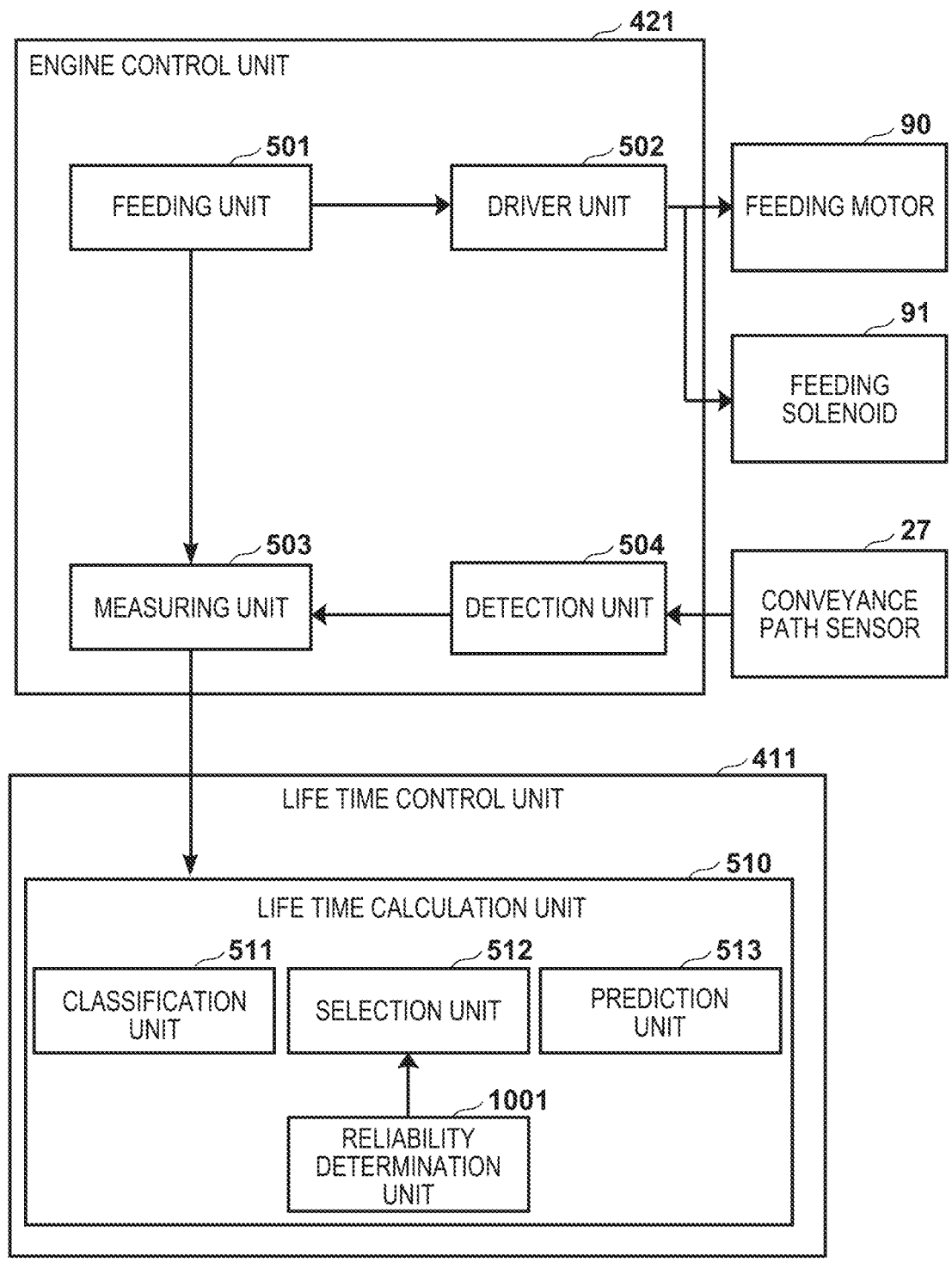
FIG. 10 is a functional block diagram describing the functions of an engine control unit and a life time control unit according to the second embodiment.

FIG. 10 is a functional block diagram for describing functions of the engine control unit 421 and the life time control unit 411 according to the second embodiment. The parts that are common to FIG. 5 of the first embodiment described above are indicated by the same reference numbers. The difference from FIG. 5 is in that the life time calculation unit 510 has the reliability determination unit 1001. Note that a configuration may be taken so that the printer engine 420 has the function of the life time control unit 411 of the server 410.

The determination criteria for reliability in the second embodiment will be described with reference to FIG. 23B. FIG. 23B indicates the result of determination of reliability in relation to a subset as indicated in FIG. 9. In the second embodiment, a subset whose variance is less than 1000 (predetermined value) and the number of data is equal to or greater than 1000 (predetermined number) is determined to be high in reliability.

Next, the operations of the engine control unit 421 and the life time control unit 411 in the second embodiment will be described with reference to the flowchart in FIG. 11.

Figure 11:
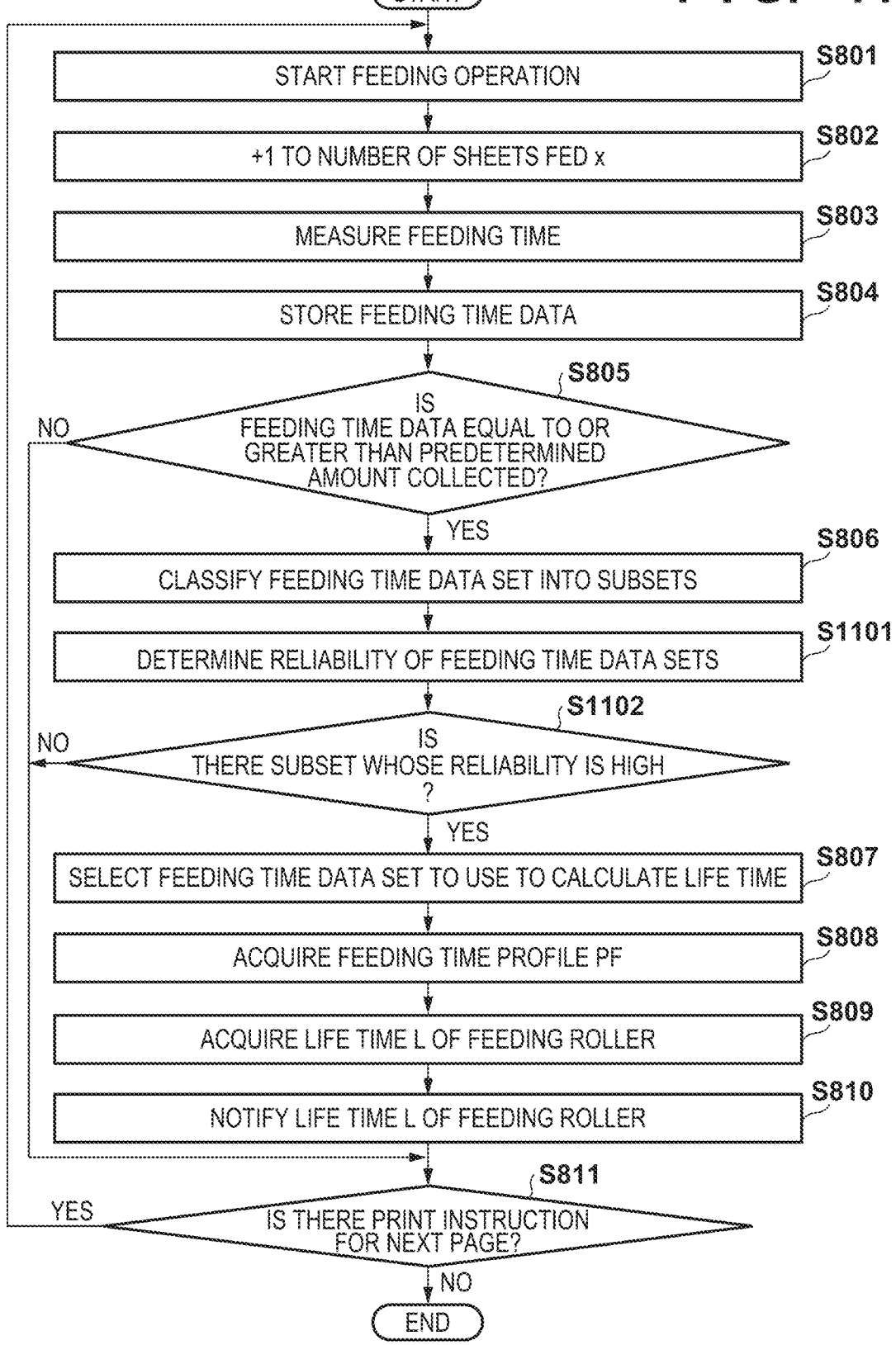
FIG. 11 is a flowchart describing processing for obtaining the remaining life time of a feeding roller in the image forming apparatus according to the second embodiment.

FIG. 11 is a flowchart describing processing for obtaining the remaining life time of the feeding roller 22 in the image forming apparatus 100 according to the second embodiment. Note that the processing indicated in this flowchart is realized by the CPU 422 executing a program deployed in the RAM 424 and working together with the server control unit. Note that in FIG. 11, the processing that is common to FIG. 8 described above are given the same reference numbers, and the description thereof will be omitted.

In step S806, the computing device 412 functions as the classification unit 511 and after classifying subsets of the feeding time data set, proceeds to step S1101 In step S1101, the computing device 412 functions as the reliability determination unit 1001 to target all subsets and determine the reliability of the feeding time data sets. Specifically, the computing device 412 determines if any of the delay side data and the early arrival side data is high in reliability in accordance with the determination criteria for reliability as indicated in FIG. 23B described above. Then, the processing proceeds to step S1102 in which the computing device 412 determines whether there is a subset whose reliability is high and if there a subset whose reliability is high, proceeds to step S807 in which the computing device 412 functions as the selection unit 512 to select a feeding time data set to be used in the acquisition of remaining life time. Meanwhile, in step S1102, the computing device 412, if it determines that there is no subset whose reliability is high, proceeds to step S811 without performing the acquisition of the remaining life time of the feeding roller.

Note that in the second embodiment, the feeding time profile PF acquired by the prediction unit 513 in step S808 is the prediction of feeding time in a case where feeding is started from Pn in FIG. 3. Accordingly, the life time calculation unit 510, in step S809, acquires the remaining life time L of the feeding roller using the following Expression (5) based on the maximum feeding time Tn in a case where feeding is started from the position Pn and the feeding time t which is acquired by the feeding time profile PF.

$$L = \left(1 - \frac{t}{Tn}\right) \times 100 \qquad \text{Expression (5)}$$

Note that in the second embodiment, the unit of feeding time t is milliseconds, the unit of the number of sheets fed x is sheets, and the unit of remaining life time L of the feeding roller is percentage. Also, Tn=130) ms which is the maximum time that is preset in which conveyance can be performed in a case where feeding is started from Pn.

As described above, according to the second embodiment, because the remaining life time of the feeding roller is predicted based on a subset whose data reliability is high, it becomes possible to predict the remaining life time of the feeding roller more accurately. As a result, it becomes possible to ascertain the replacement timing of the feeding roller at an early stage and also, because it is possible to know where the feeding roller is in its life before the replacement timing of the feeding roller is reached, it becomes possible to improve the usage state such as changing the type of recording material.

Note that the present invention is not limited to the second embodiment. For example, determination criteria for reliability may be changed depending on factors such as the type of the recording material and temperature and humidity of the environment.

Third Embodiment

In the third embodiment, the classification unit 511 of the life time calculation unit 510 determines whether or not there is a tendency change in the feeding time data set before classifying the feeding time data set into a plurality of subsets based on a predetermined reference. Then, if there is a tendency change, a plurality of subsets are classified based on the feeding time data set from where there is a tendency change onward. Because the hardware configuration, the system configuration, and the like of the image forming apparatus according to the third embodiment are the same as in the first embodiment described above, only parts that are different from the first embodiment will be described in the third embodiment. In the first embodiment described above, the classification unit 511 classified the feeding time data set that was stored in the RAM 424 into a plurality of subsets by the measuring unit 503 based on a predetermined reference. However, the tendency of the feeding time may change as indicated in FIG. 12 due to factors such as the replacing of the feeding roller, the change of the recording material to be used, and the like.

Figure 12:
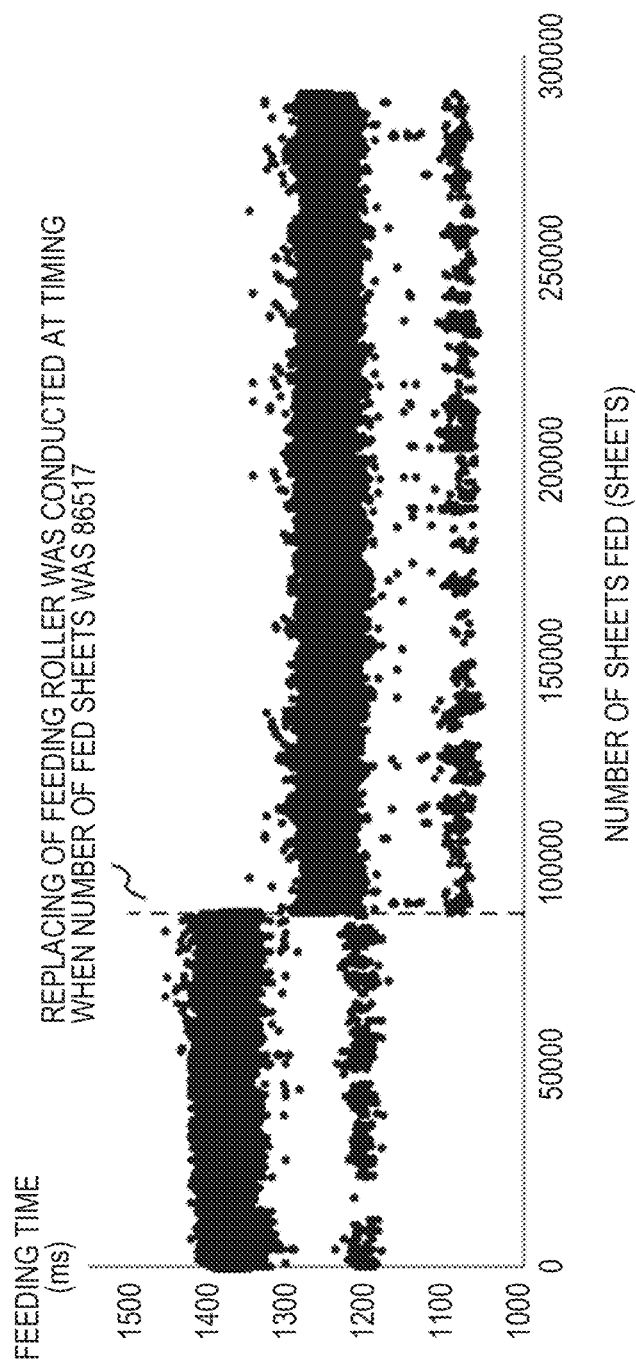
FIG. 12 is a graph view indicating an example of an actual feeding time data set in a third embodiment.

FIG. 12 is a graph view indicating an example of an actual feeding time data set in the third embodiment.

Figure 13:
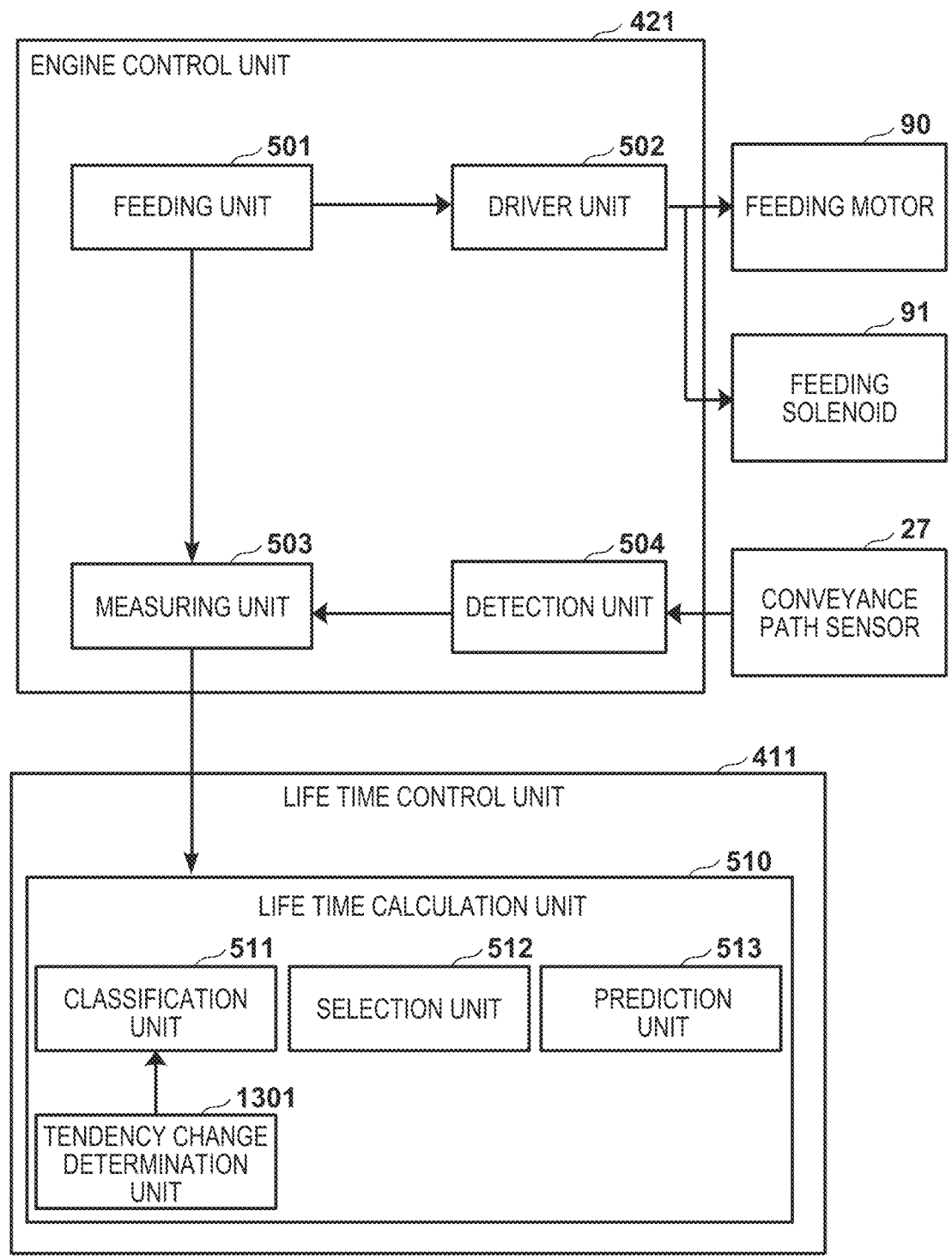
FIG. 13 is a functional block diagram describing the functions of an engine control unit and a life time control unit according to the third embodiment.

In FIG. 12, because the feeding roller was changed at a point in time when the number of sheets fed was 86517 sheets, the feeding time data indicates tendencies that are different before and after this replacement. Accordingly, when the remaining life time of the feeding mechanism is predicted based on such a data set in which the feeding time data that indicates different tendencies coexist, there is a possibility that the accuracy of the predicted remaining life time may lower. Accordingly, in the third embodiment, as illustrated in FIG. 13, the life time calculation unit 510 has a tendency change determination unit 1301. This tendency change determination unit 1301 determines a tendency change in the feeding time data set which was measured by the measuring unit 503 and then was stored in the RAM 424 in accordance with the determination criteria for determining whether or not there is a tendency change. The classification unit 511, in a case where it is determined that there is a tendency change by the tendency change determination unit 1301, classifies into a plurality of subsets based on the feeding time data set from a point in time when there was the tendency change onward.

FIG. 13 is a functional block diagram for describing functions of the engine control unit 421 and the life time control unit 411 according to the third embodiment. The parts that are common to FIG. 5 of the first embodiment described above are indicated by the same reference numbers. The difference from FIG. 5 is in that the life time calculation unit 510 has the tendency change determination unit 1301.

The determination criteria for a tendency change in the third embodiment will be described with reference to FIG. 23C. FIG. 23C indicates a result of conducting tendency change determination on the feeding time data set as indicated in FIG. 12, for example. In the third embodiment, in the feeding time data set, it is determined that a tendency change has occurred in a case where the average value of the feeding time data of the most recent 30 sheets has changed by 25 or more. According to the determination criteria for tendency change in the third embodiment, it is determined that a tendency change has occurred at a point in time when the number of sheets fed x=86517.

Figure 14:
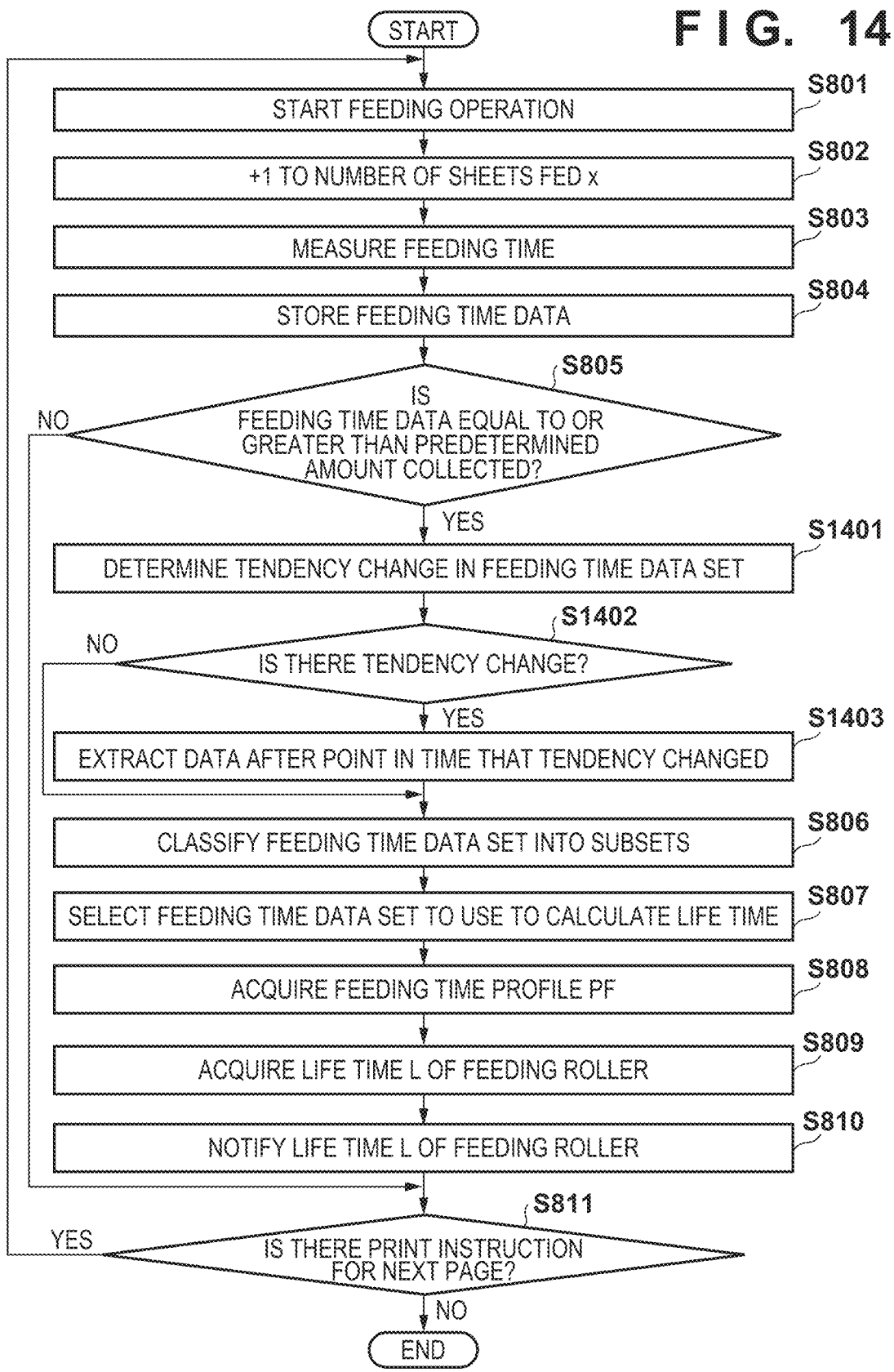
FIG. 14 is a flowchart describing processing for obtaining the remaining life time of a feeding roller in the image forming apparatus according to the third embodiment.

FIG. 14 is a flowchart describing processing for obtaining the remaining life time of the feeding roller in the image forming apparatus 100 according to the third embodiment. Note that the processing indicated in this flowchart is realized by the CPU 422 executing a program deployed in the RAM 424 and working together with the server control unit. Note that in FIG. 14, the processing that is common to FIG. 8 described above are given the same reference numbers, and the description thereof will be omitted.

In step S805, the computing device 412, when it determines that the feeding time data set is equal to or greater than a predetermined amount, proceeds to step S1401. In step S1401, the computing device 412 functions as the tendency change determination unit 1301 to determine the presence or absence of tendency change in the feeding time data set. Specifically, the computing device 412, in accordance with determination criteria of the tendency change as indicated in FIG. 23C described above, obtains the average value of the feeding time data of the most recent 30 sheets and determines, in a case where the feeding time data has changed by 25 ms or more, that the tendency has changed.

In step S1402, the computing device 412 determines whether or not there is a tendency change in the feeding time data set and if it determines that there is a tendency change, proceeds to step S1403 in which the computing device 412 extracts data from a point in time when there was the tendency change in the feeding time data set onward. For example, as indicated in FIG. 23C, in a case where the computing device 412 determines that there was a tendency change within a predetermined time (for example, the most recent 30 minutes) whose amount of change was equal to or greater than a predetermined amount, and extracts the feeding time data from when there was the tendency change when the number of sheets fed x=86517 onward. Then, the processing proceeds to step S806 in which the computing device 412 functions as the classification unit 511 and classifies the extracted feeding time data set into the delay side data set and the early arrival side data set. Note that in step S1402, the computing device 412, when it determines that there is no tendency change, proceeds to step S806 and then executes the same processing as in the first embodiment.

As described above, according to the third embodiment, in a case where the feeding time data has changed greatly due to the replacing of the feeding roller and the like, for example, it is possible to predict the remaining life time of the feeding roller by using the feeding time data from the change onward. As a result, it becomes possible to predict the remaining life time of the feeding roller more accurately. As a result, it becomes possible to ascertain the replacement timing of the feeding roller at an early stage and also, because it is possible to know where the feeding roller is in its life before the replacement timing of the feeding roller is reached, it becomes possible to improve the usage state such as changing the type of recording material.

Note that the present invention is not limited to the third embodiment. For example, in addition to the configuration of the third embodiment, tendency change determination indicated in the second embodiment may be performed. Also, a configuration may be taken so as to be able to detect separately a change of the type of the recording material, the replacing of the feeding roller, and the like and to perform tendency change determination based on that detection result.

Fourth Embodiment

Next, a fourth embodiment of the present invention will be described. In the fourth embodiment, description will be given for an example in which the feeding time it takes for the recording material S1 positioned at the top to reach the conveyance path sensor 27 is corrected in accordance with the amount of the recording material S that is accommodated within the feeding cassette 21. Because the hardware configuration, the system configuration, and the like of the image forming apparatus 100 according to the third embodiment are basically the same as in the first embodiment described above, only parts that are different from the first embodiment will be described in the third embodiment.

Figure 15:
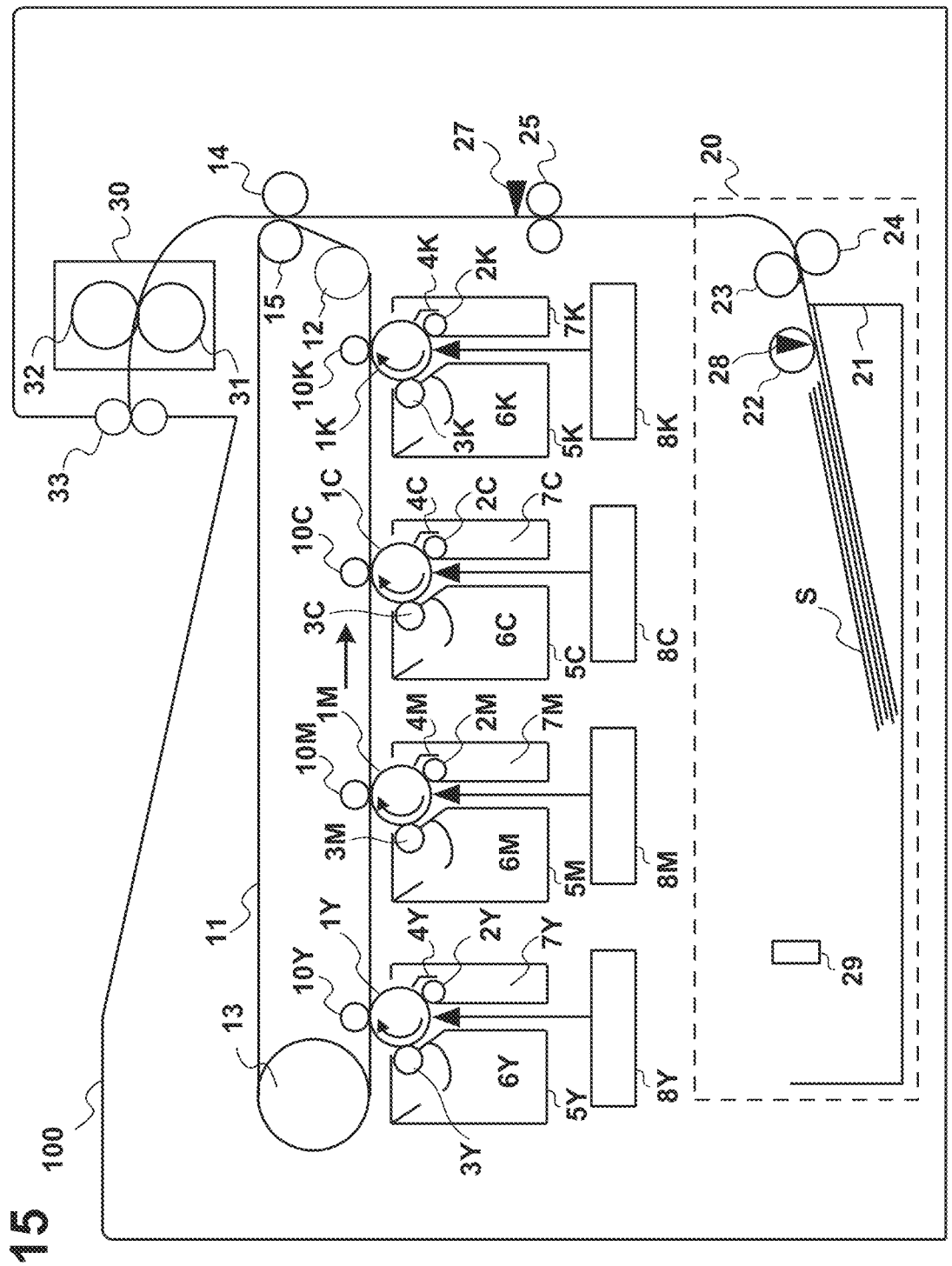
FIG. 15 is a schematic configuration diagram of an image forming apparatus in which a plurality of image forming units are configured in parallel by adopting an intermediate transfer belt according to a fourth embodiment.

FIG. 15 is a schematic configuration diagram of the image forming apparatus 100 in which a plurality of image forming units are configured in parallel by adopting an intermediate transfer belt according to the fourth embodiment. In FIG. 15, the parts that are common to the configuration in FIG. 1 according to the first embodiment described above are given the same reference numbers, and the description thereof will be omitted.

In FIG. 15, a recording material detection sensor 28 and a feeding cassette absence/presence detection sensor 29 have been added in relation to the configuration in FIG. 1. The recording material detection sensor 28 detects the amount of the recording material S that is accommodated within the feeding cassette 21. Also, the absence/presence detection sensor 29 of the feeding cassette detects whether or not the feeding cassette 21 that accommodates the recording material S is attached to the image forming apparatus 100.

Next, a detection mechanism for the remaining amount of the recording material in the fourth embodiment will be described with reference to FIG. 16A and FIG. 16B.

Figure 16A:
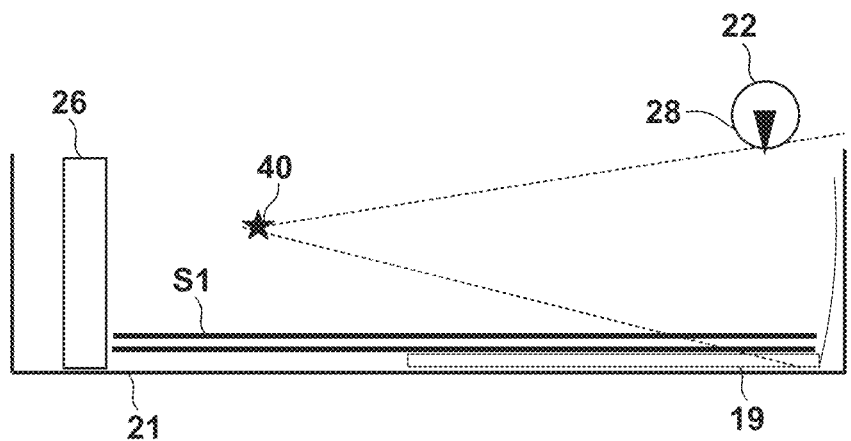
FIG. 16A and FIG. 16B are a schematic cross-sectional view describing a remaining amount detection operation for a recording material S in the image forming apparatus according to the fourth embodiment.
Figure 16B:
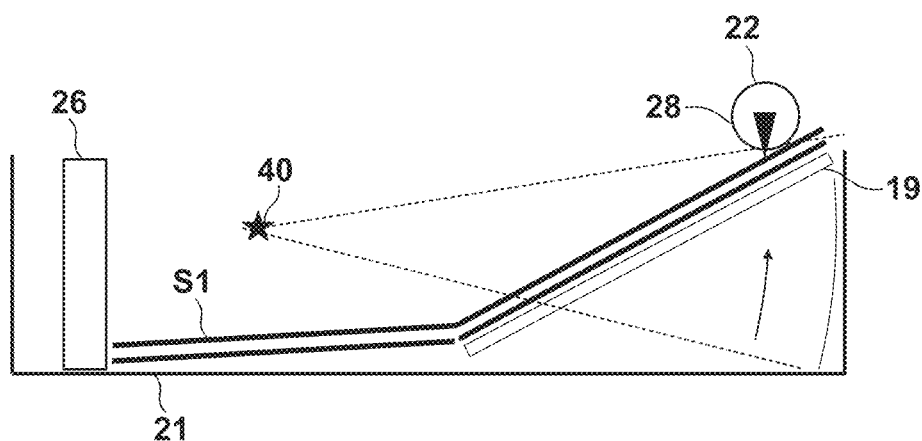

FIG. 16A and FIG. 16B are a schematic cross-sectional view describing a detection operation for the remaining amount of the recording material S in the image forming apparatus 100 according to the fourth embodiment.

FIG. 16A is a cross-sectional view of the feeding mechanism at a point in time when the feeding cassette 21 accommodating the recording material S is connected to the image forming apparatus 100. The feeding mechanism 20, when it detects that the feeding cassette 21 is connected to the image forming apparatus 100 by the absence/presence detection sensor 29 of the feeding cassette, causes a feeding cassette bottom plate 19 to rise by driving a lift up motor (not shown) until the recording material S1 positioned at the top is sensed by the recording material detection sensor 28 as illustrated in FIG. 16B. As a result, the recording material S is pushed up by the feeding cassette bottom plate 19 centered on a center of oscillation 40 of the feeding cassette bottom plate 19 and then is moved to a position where the feeding can be performed by the feeding roller 22. At this time, the feeding mechanism 20 can detect the amount of the recording material S that is accommodated within the feeding cassette 21 based on the amount of time the lift up motor was driven.

Here, the amount of the recording material S is indicated by percentage, and this amount is converted based on the driving time of the lift up motor, which is a preset reference. In a case where the amount of the recording material S is large, the recording material S1 is detected by the recording material detection sensor 28 immediately after driving the lift up motor; therefore it is possible to detect that the amount of the recording material S is large. Meanwhile, in a case where the amount of the recording material S is small, the recording material S1 is detected by the recording material detection sensor 28 a while after driving the lift up motor; therefore it is possible to detect that the amount of the recording material S is small. Then, the feeding mechanism 20, by decreasing the amount of the detected recording material S every time the recording material S is fed one by one from the feeding cassette 21, can predict the amount of the recording material S that is accommodated within the feeding cassette 21 at all times. Note that in the fourth embodiment, although description was given for a method for detecting the amount of the recording material S using the driving time of the lift up motor, the present invention is not limited to this, and another method may be used for detection such as detecting by another sensor the amount that the feeding cassette bottom plate 19 is pushed up, for example, as long as the amount of the recording material S can be detected.

Figure 17:
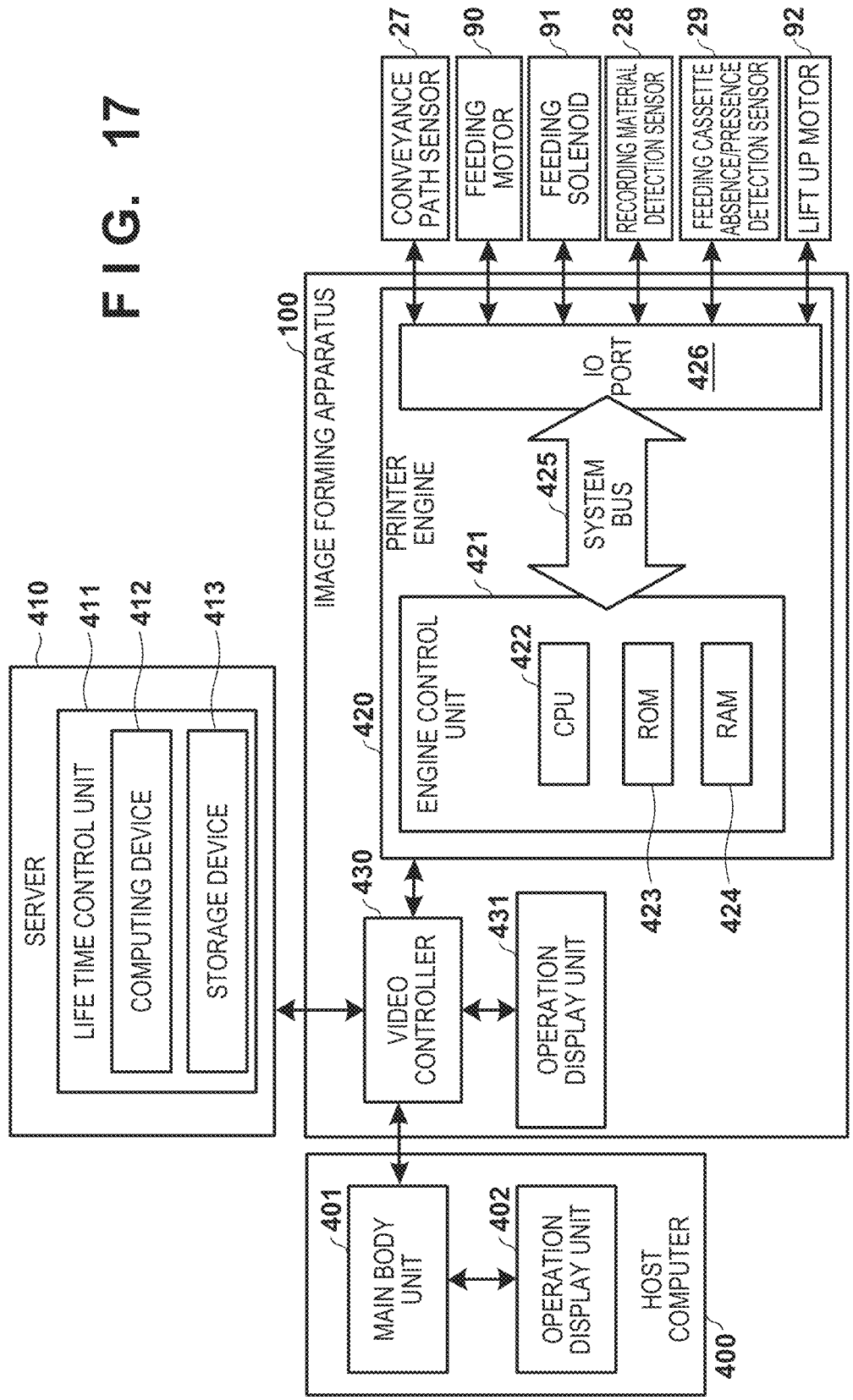
FIG. 17 is a block diagram describing a hardware configuration of the image forming apparatus and a configuration of an image forming system that includes the image forming apparatus according to the fourth embodiment.

FIG. 17 is a block diagram describing a hardware configuration of the image forming apparatus 100 and a configuration of an image forming system that includes the image forming apparatus 100 according to the fourth embodiment. In FIG. 17, the parts that are common to FIG. 4 according to the first embodiment described above are given the same reference numbers, and the description thereof will be omitted. In the fourth embodiment, the recording material detection sensor 28, the absence/presence detection sensor 29 of the feeding cassette, and a lift up motor 92 have been added in relation to the configuration in FIG. 4. In the configuration the fourth embodiment, the recording material detection sensor 28, the absence/presence detection sensor 29 of the feeding cassette, and the lift up motor 92 are connected to the IO port 426 of the printer engine 420 as illustrated in FIG. 17. The CPU 422 controls these devices via this the IO port 426.

Figure 18:
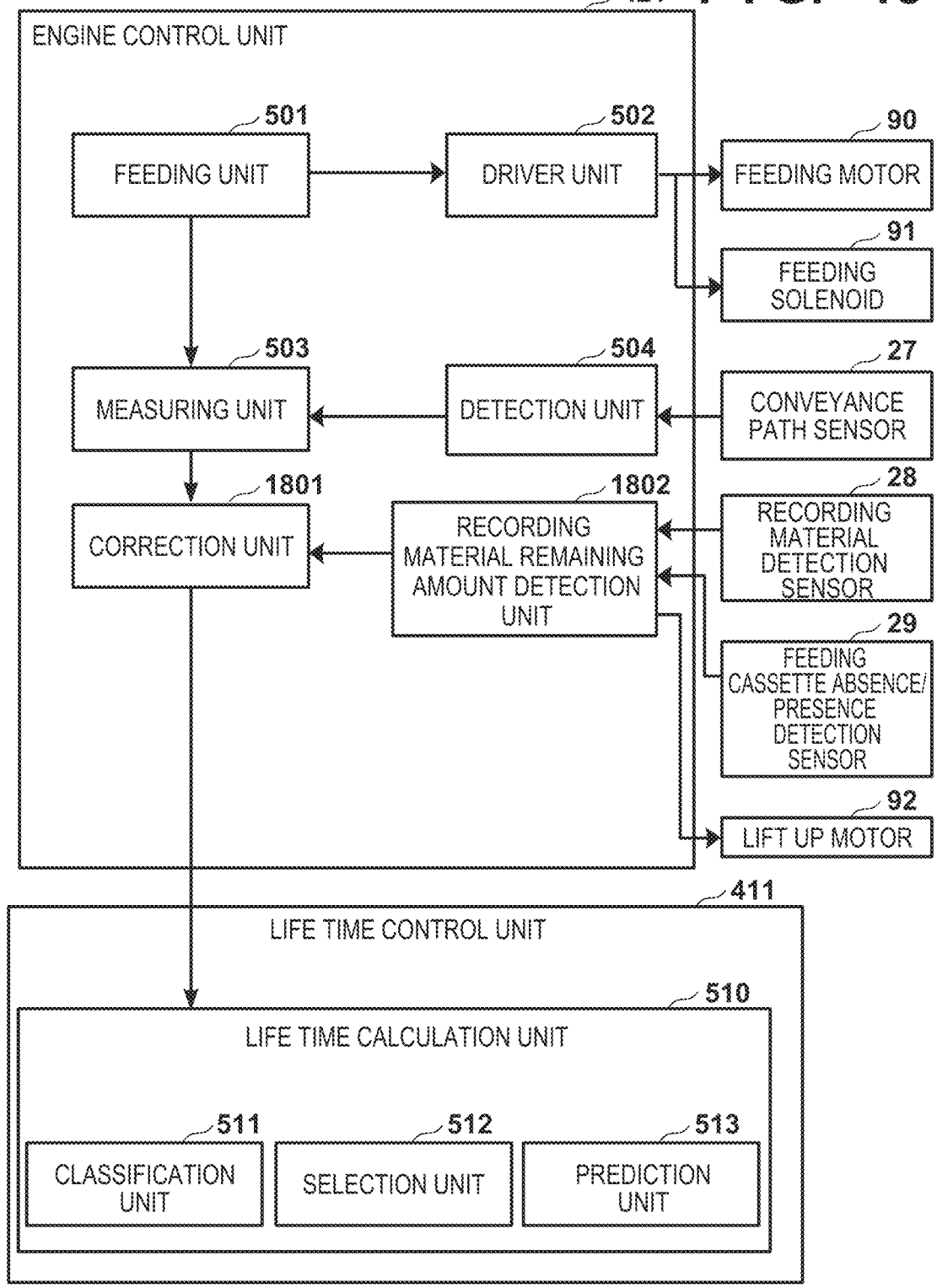
FIG. 18 is a functional block diagram describing the functions of an engine control unit and a life time control unit according to a fifth embodiment.

FIG. 18 is a functional block diagram for describing functions of the engine control unit 421 and the life time control unit 411 according to a fifth embodiment. In FIG. 18, the parts that are common to FIG. 5 according to the first embodiment described above are given the same reference numbers, and the description thereof will be omitted.

Here, a correction unit 1801 has a recording material remaining amount detection unit 1802 as a function for correcting the feeding time measured by the measuring unit 503. The correction unit 1801 corrects and then stores in the RAM (memory) 424 the feeding time from a timing when the feeding unit 501 instructs a feeding operation until the leading edge of the recording material S reaches the conveyance path sensor 27 based on the amount of the recording material S that is accommodated within the feeding cassette 21 which was detected by the recording material remaining amount detection unit 1802. The feeding time stored in the RAM 424 is also stored in the storage device 413 of the life time control unit 411 via the video controller 430. Note that the method for correcting the feeding time by the correction unit 1801 in the fourth embodiment will be described later. The recording material remaining amount detection unit 1802, when it detects by the absence/presence detection sensor 29 of the feeding cassette that the feeding cassette 21 is attached to the image forming apparatus 100, drives the lift up motor 92, senses by the recording material detection sensor 28 the recording material S1 that is positioned at the top, and then detects the amount of the recording material S based on the result.

Next, correction control by the correction unit 1801 which is an aspect of the fourth embodiment will be described.

Figure 19:
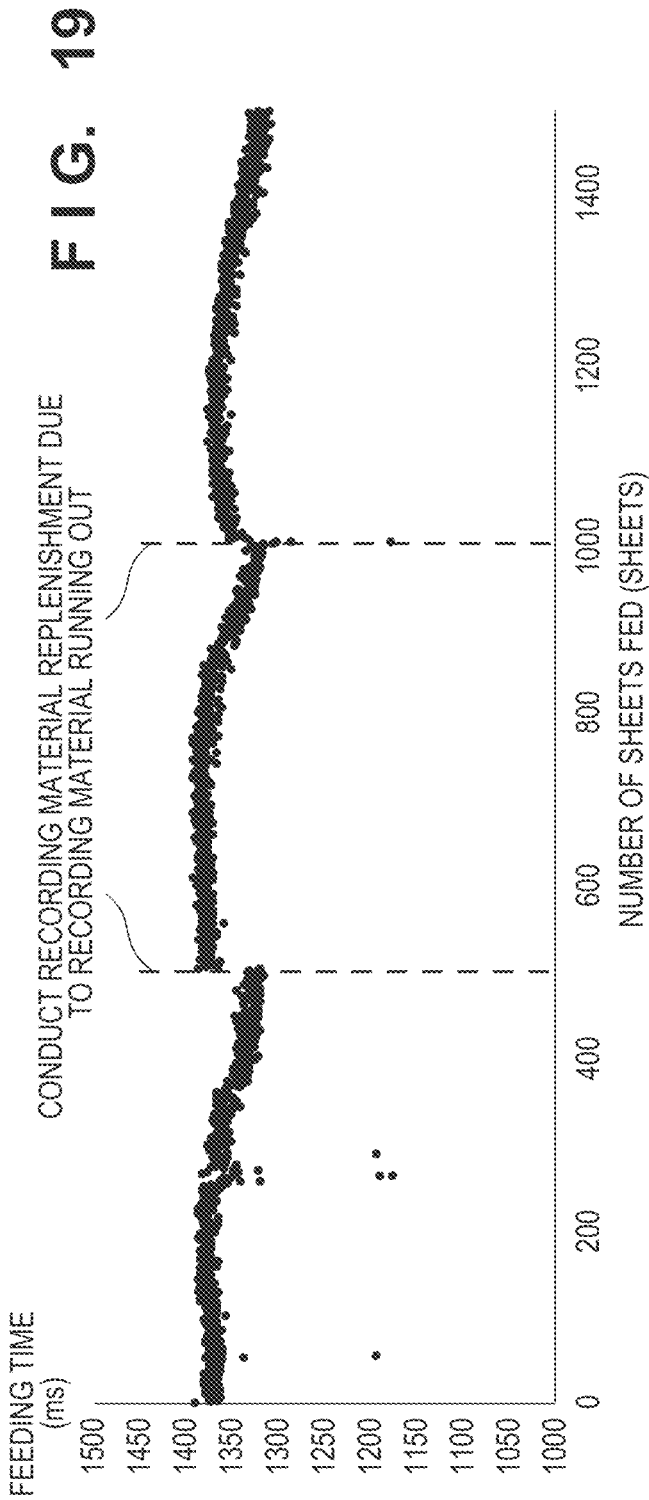
FIG. 19 is a view indicating an example of the transition of feeding time when the feeding operation is performed repeatedly, the recording material S being replenished whenever the recording material S that is accommodated within a feeding cassette runs out, in the image forming apparatus according to the fourth embodiment.

FIG. 19 is a view indicating an example of the transition of feeding time when the feeding operation is performed repeatedly, the recording material S being replenished whenever the recording material S that is accommodated within the feeding cassette 21 runs out, in the image forming apparatus 100 according to the fourth embodiment.

As indicated in FIG. 19, feeding time increases or decreases as the amount of the recording material S that is accommodated within the feeding cassette 21 decreases. This is because, as illustrated in FIG. 20, the position of the leading edge of the recording material S changes when the recording material S is pushed up to a position where feeding can be performed by the feeding cassette bottom plate 19 in accordance with the distance from the center of oscillation 40 of the feeding cassette bottom plate 19 to a position of the leading edge of the recording material.

Figure 20:
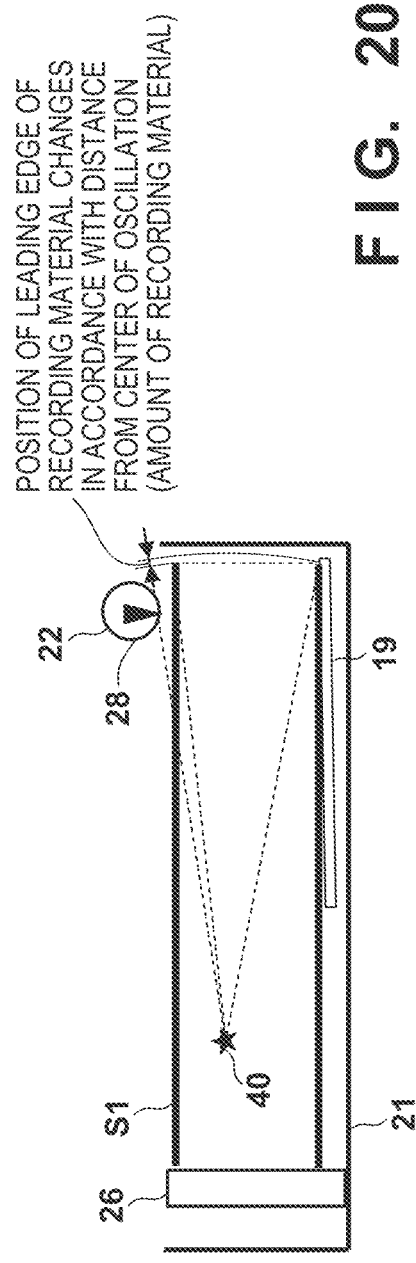
FIG. 20 is a cross-sectional view illustrating the position of the leading edge of a recording material in accordance with the amount of the recording material in the image forming apparatus according to the fourth embodiment.

FIG. 20 is a cross-sectional view illustrating the position of the leading edge of a recording material in accordance with the amount of the recording material in the image forming apparatus 100 according to the fourth embodiment.

In other words, the feeding time changes because the position of the leading edge of the recording material S changes in accordance with the amount of the recording material S that is accommodated within the feeding cassette 21. Therefore, in the correction unit 1801 according to a fourth embodiment, as indicated in FIG. 23D, the feeding time is corrected in accordance with the remaining amount of the recording material sensed by the recording material remaining amount detection unit 1802.

Because as the amount of the recording material decreases, the position of the leading edge of the recording material changes and the feeding time shortens, feeding time t_a which was measured by the measuring unit 503 and feeding time t_b after correction, using the following Expression (6) based on an amount of correction Z of the feeding time indicated in FIG. 23D, are acquired.

$$t\_b = t\_a + Z \quad \text{Expression (6)}$$

Note that in the fourth embodiment, as indicated in FIG. 23D, although the unit of the amount of the recording material is percentage, the unit may be the number of sheets of the recording material and although the feeding time is corrected by a unit of time, the unit may be a unit of distance. Also, although the amount of correction by which the feeding time is corrected is stored in a table format as in FIG. 23D, the feeding time may be corrected by a calculation equation.

Also, although in the fourth embodiment, description was given for an example in which the feeding time is corrected for any case, correction by the correction unit 1801 may be invalid, in other words, the feeding time may not need to be corrected, depending on the type of the recording material.

Figure 21:
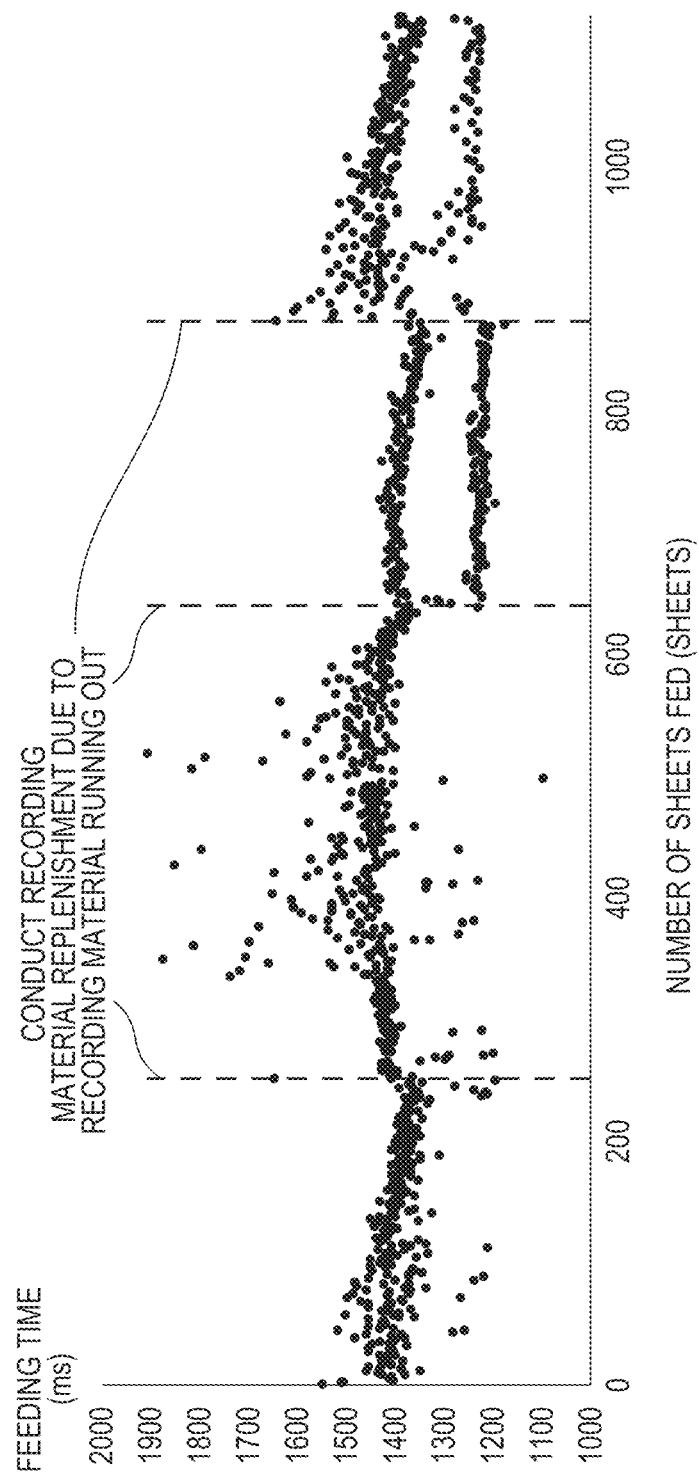
FIG. 21 is a graph view indicating an example of feeding time data in the fourth embodiment.

This is because, as indicated in FIG. 21, for example, depending on the type of the recording material, a slip or the like may occur when feeding the recording material S1 by the feeding roller 22 and the feeding time may not be stable. FIG. 21 is a graph view indicating an example of feeding time data in the fourth embodiment.

Figure 22:
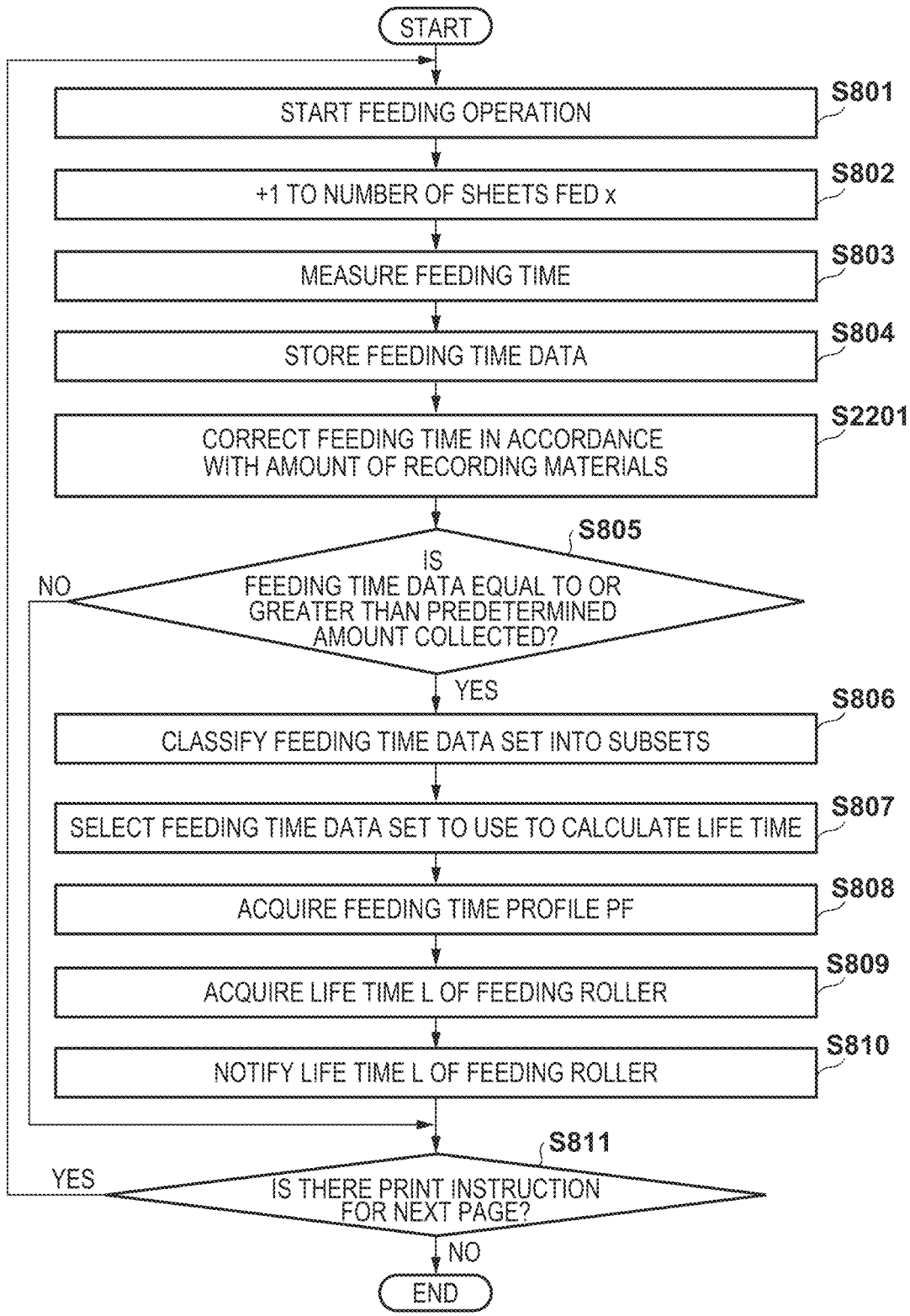
FIG. 22 is a flowchart describing processing for obtaining the remaining life time of a feeding roller in the image forming apparatus according to the fourth embodiment.

FIG. 22 is a flowchart describing processing for obtaining the remaining life time of the feeding roller in the image forming apparatus 100 according to the fourth embodiment. Note that the processing indicated in this flowchart is realized by the CPU 422 executing a program deployed in the RAM 424 and working together with the server control unit. Note that in FIG. 22, the processing that is common to FIG. 8 described above are given the same reference numbers, and the description thereof will be omitted.

In step S804, the CPU 422 stores in the RAM 424 the measurement result by the measuring unit 503 and the detection unit 504 and then proceeds to step S2201. In step S2201, the CPU 422 functions as the correction unit 1801 to correct the feeding time data based on the amount of the recording material S that is accommodated within the feeding cassette 21 detected by the recording material remaining amount detection unit 1802. The CPU 422 transmits the corrected feeding time data to the server control unit. The computing device 412 stores in the storage device 413 the received correction result.

Specifically, the computing device 412 refers to the feeding time correction table indicated in FIG. 23D described above and then corrects the feeding time in accordance with the amount of the recording material. Then, in step S806 onward, the computing device 412 functions as the life time calculation unit 510, and the remaining life time L of the feeding roller is acquired using the corrected feeding time data when the remaining life time of the feeding roller is predicted based on the feeding time data set.

As explained above, according to the fourth embodiment, by correcting the variation of the feeding time data based on the amount of the recording material, it becomes possible to accurately predict the remaining life time of the feeding roller. Also, it becomes possible to ascertain the replacement timing of the feeding roller at an early stage and also, because it is possible to ascertain what stage the feeding roller is in its life before the replacement timing of the feeding roller is reached, it becomes possible to improve the usage state such as changing the type of recording material.

Note that the present invention is not limited to the fourth embodiment. Although the correction of the feeding time is conducted by the image forming apparatus 100, the amount of the recording material may be notified to the server and then the feeding time data may be corrected on that server, for example. Also, although in the fourth embodiment, description was given for a method for predicting of the remaining life time of the feeding roller from the feeding time profile, the present invention is not limited to this, and any method may be used as long as the method is a method for predicting the remaining life time of the feeding roller from the feeding time.

Fifth Embodiment

In the present embodiment, description will be given regarding a method for determining the possibility that the recording material may slip during the feeding operation.

[Description of Image Forming Apparatus]

Figure 24:
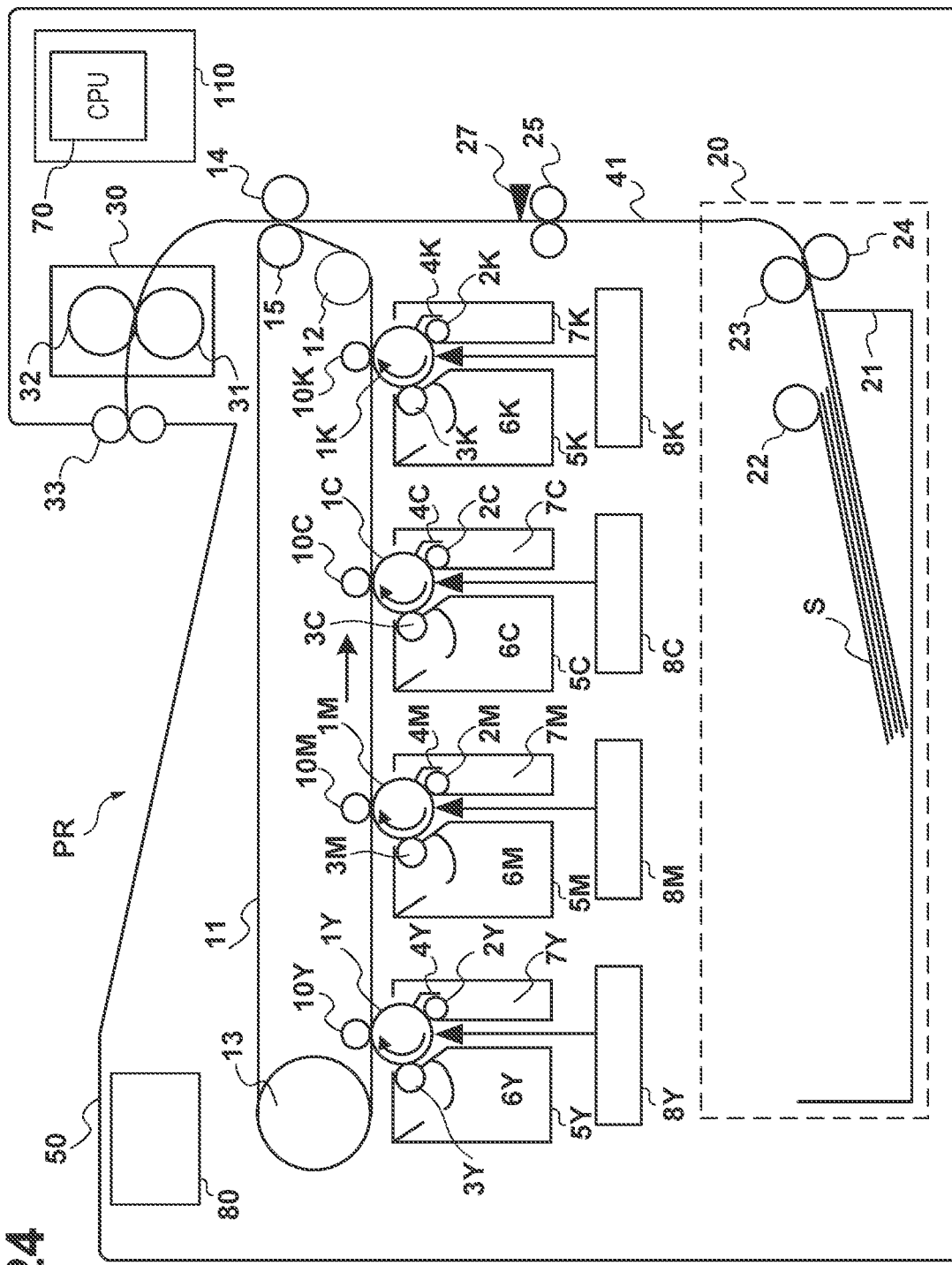
FIG. 24 is a cross-sectional view of the image forming apparatus in the fifth and sixth embodiments.

An electrophotographic printer PR (image forming apparatus) will be described as an example of a feeding apparatus that can adopt the present embodiment. FIG. 24 is a schematic configuration diagram of the printer PR.

The printer PR is a tandem color laser beam printer and is configured to be able to output a color image by superimposing four colors of toners—yellow (Y), magenta (M), cyan (C), and black (K). Note that in the following description, particularly in the description of members for which yellow, magenta, cyan, and black do not need to be distinguished, for the sake of descriptive convenience, the reference numeral subscripts Y, M, C, and K will be omitted.

The process cartridges 5 each have the toner container 6. Furthermore, the process cartridge 5 has the photosensitive drum 1 which is an image carrier. Furthermore, the process cartridge 5 has the charging roller 2, the developing roller 3, the drum cleaning blade 4, and the waste toner container 7.

The charging roller 2, by applying a voltage of a predetermined negative polarity to the photosensitive drum 1, charges the surface of the photosensitive drum 1 to the voltage of the predetermined negative polarity. The laser unit 8 is disposed below the process cartridge 5, and the laser unit 8 performs exposure in relation to the photosensitive drum 1 based on an image signal. As a result, an electrostatic latent image is formed on the surface of the photosensitive drum 1. The developing roller 3 applies a voltage of a predetermined negative polarity to the photosensitive drum 1 and then by supplying the photosensitive drum 1 with toner that is accommodated in the toner container 6, develops an electrostatic latent image. As a result, the Y, M, C, and K toner images are each formed on the surface of the photosensitive drum 1. Note that the toner used in the present embodiment is negatively charged.

An intermediate transfer member unit is configured by the intermediate transfer member 11, the drive roller 12, the tension roller 13, and the opposing roller 15. Also, the primary transfer roller 10 is disposed inside the intermediate transfer member 11 facing the photosensitive drum 1, and is of a configuration in which a transfer voltage is applied by a voltage application unit (not shown). Each photosensitive drum 1 and the intermediate transfer member 11 are rotated in the direction of the arrow and then by applying a positive voltage to the primary transfer roller 10, the toner image that is formed on the photosensitive drum 1 is primary-transferred onto the intermediate transfer member 11. The toner images on the photosensitive drums 1 are primary-transferred onto the intermediate transfer member 11 in the order of Y, M, C, and K and then are conveyed to the secondary transfer roller 14 in a state in which the toner images of the four colors are overlapped. The toner that is remaining on the photosensitive drum 1 after the primary transfer is scraped off by a cleaning blade 4 and then is accommodated in the waste toner container 7.

The feeding mechanism 20 has the feeding roller 22 (feeding member) that feeds the recording material S to a conveyance path 41 from an accommodation cassette (feeding cassette) 21 which accommodates the recording material S. Furthermore, the feeding mechanism 20 has the conveyance roller 23 (conveyance member) that conveys the fed recording material S and the separation roller 24 (separation member) that separates a plurality of the recording materials S into single sheets and conveys the single sheets. The accommodation cassette 21 can attach/detach in relation to an apparatus main body 50 (printer housing) and is made so that the user can perform replenishment or replacement of the recording material S. Then, the recording material S that is conveyed from the feeding mechanism 20 is conveyed to the secondary transfer roller 14 by the registration roller pair 25. In order to transfer the toner image from the intermediate transfer member 11 to the recording material S, a voltage of positive polarity is applied to the secondary transfer roller 14. As a result, the toner image on the intermediate transfer member 11 is secondary transferred onto the conveyed recording material S. Then, the recording material S to which the toner image is transferred is conveyed to the fixing device 30 and is heated and pressurized by the fixing film 31 and the pressure roller 32, and the toner image is fixed to the surface of the recording material S. The recording material S on which the toner image has been fixed is discharged to the exterior of the apparatus main body 50 of the printer PR by a discharging roller pair 33.

In a control unit 110, an MPU (not shown) comprising a CPU 70 and the like; a RAM (not shown) that is used to calculate data that is necessary for controlling the printer PR, as a temporary storage, and the like; a ROM (not shown) that stores a program for controlling the printer PR or various data are provided. In the conveyance path 41, the conveyance path sensor 27 is disposed to detect the conveyed recording material S. When the conveyance path sensor 27 detects the recording material S, a signal that notifies accordingly is outputted to the control unit 110. The control unit 110 performs the overall control of the electrophotographic process and determines whether or not conveyance failure such as an early arrival, a delay, or a jam of the recording material S has occurred based on the signal that was notified from the conveyance path sensor 27. In a case where the control unit 110 determines that conveyance failure has occurred, the control unit 110 displays on an operation display unit 80 (operation panel) a message or an image for notifying the user that conveyance failure has occurred. Also, the control unit 110 displays on the operation display unit 80 a message or an image that indicates a means for resolving the conveyance failure as necessary.

[Description of Feeding Mechanism]

Figure 25A:
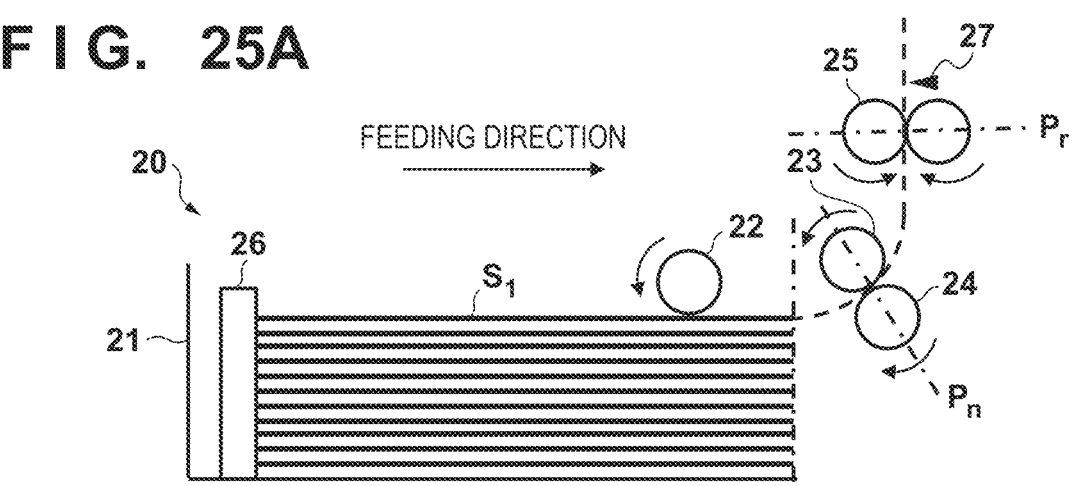
FIG. 25A to FIG. 25C are a cross-sectional view of a feeding mechanism in the fifth and sixth embodiments.
Figure 25B:
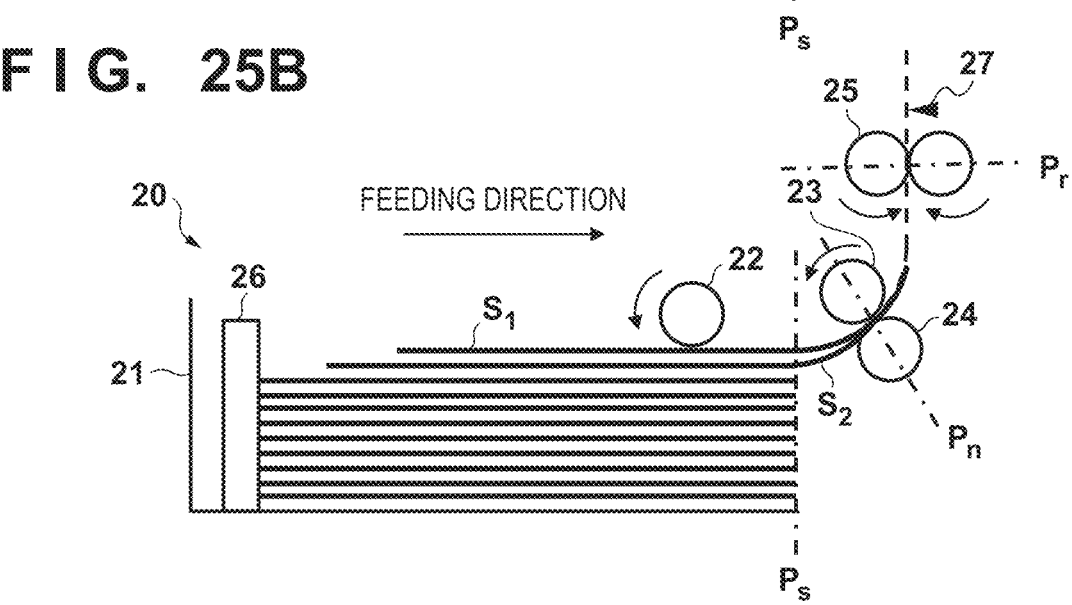
Figure 25C:
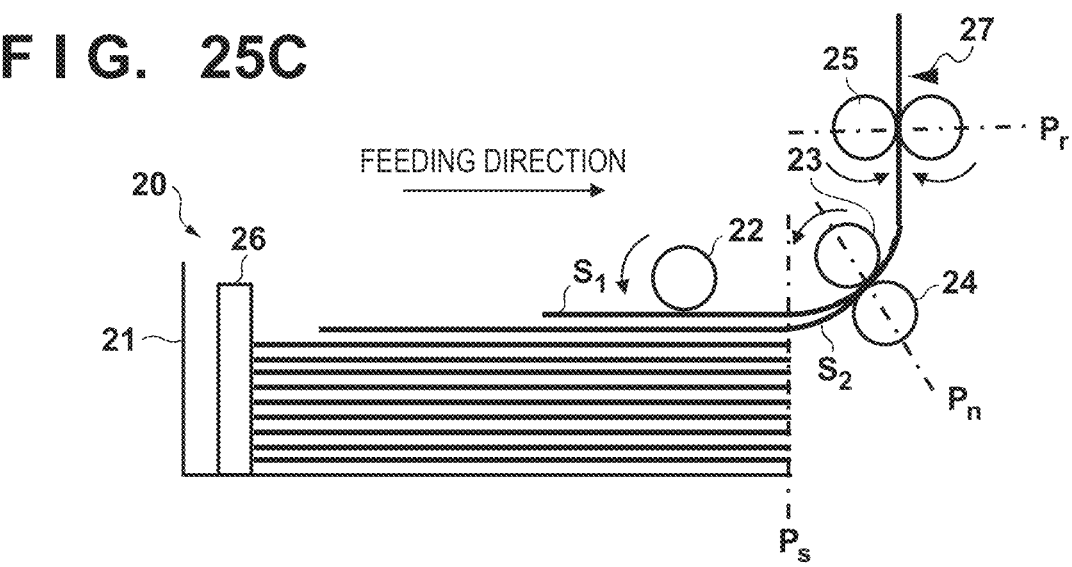

Next, the feeding mechanism 20 according to the present embodiment will be described in detail using FIG. 25A to FIG. 25C. FIG. 25A to FIG. 25C are a schematic cross-sectional view that represents the feeding operation in the present embodiment.

FIG. 25A is a cross-sectional view of the feeding mechanism 20 at a timing when the recording material S1, among a plurality of recording materials S that are accommodated in the accommodation cassette 21, that is positioned at the top is fed. The recording material S1 within the accommodation cassette 21 is positioned by the trailing edge regulating plate 26 within the accommodation cassette 21, and the leading edge of the recording material S1 when the recording material S1 is fed is at the set position Ps in FIG. 25A. Here, the leading edge of the recording material S1 is an edge on the downstream side in the feeding direction of the recording material S1 and the trailing edge of the recording material S1 is an edge on the upstream side in the feeding direction of the recording material S. When a pick start signal that is a trigger for the feeding operation is outputted and then the feeding operation is started, the feeding roller 22 and the conveyance roller 23 each rotate in the direction of the arrows in FIG. 25A and the recording material S1 is fed in the rightward direction in FIG. 25A due to the friction that occurs between the recording material S1 and the feeding roller 22.

Then, the recording material S1 reaches a separation nip portion Pn formed by the conveyance roller 23 and the separation roller 24. At this time, as illustrated in FIG. 25B, frictional force also occurs between recording materials S1 and S2, and the recording material S2 may also move. Hereinafter, this phenomenon is referred to as a multiple pickup phenomenon. The conveyance roller 23 and the separation roller 24 have a function of, when two or more recording materials S are fed to the separation nip portion Pn due to the multiple pickup phenomenon, separating the plurality of the recording materials S to single sheets and then feeding downstream only the separated single sheet of the recording material S. A torque limiter (not shown) is connected to the separation roller 24, and torque as a resistance force is applied in a direction opposite to the conveyance direction of the recording material S1. This torque is set so that when there is only one recording material S in the separation nip portion Pn, the separation roller 24 rotates following the conveyance roller 23, and when two or more recording materials S enter the separation nip portion Pn, the separation roller 24 stops. Accordingly, a plurality of recording materials S can be separated and conveyed downstream one by one by the separation nip portion Pn.

Then, when the feeding roller 22 and the conveyance roller 23 further continue to rotate, the recording material S1 passes through the registration roller pair 25, and the leading edge of the recording material S1 reaches the position Pr where the leading edge is detected by the conveyance path sensor 27 as illustrated in FIG. 25C. The time elapsed from when the pick start signal that is the trigger for the feeding operation was outputted until the recording material S1 reaches the conveyance path sensor 27 is the feeding time. This feeding time is measured by the CPU 70 that is included in the control unit 110 described in FIG. 24.

Figure 26:
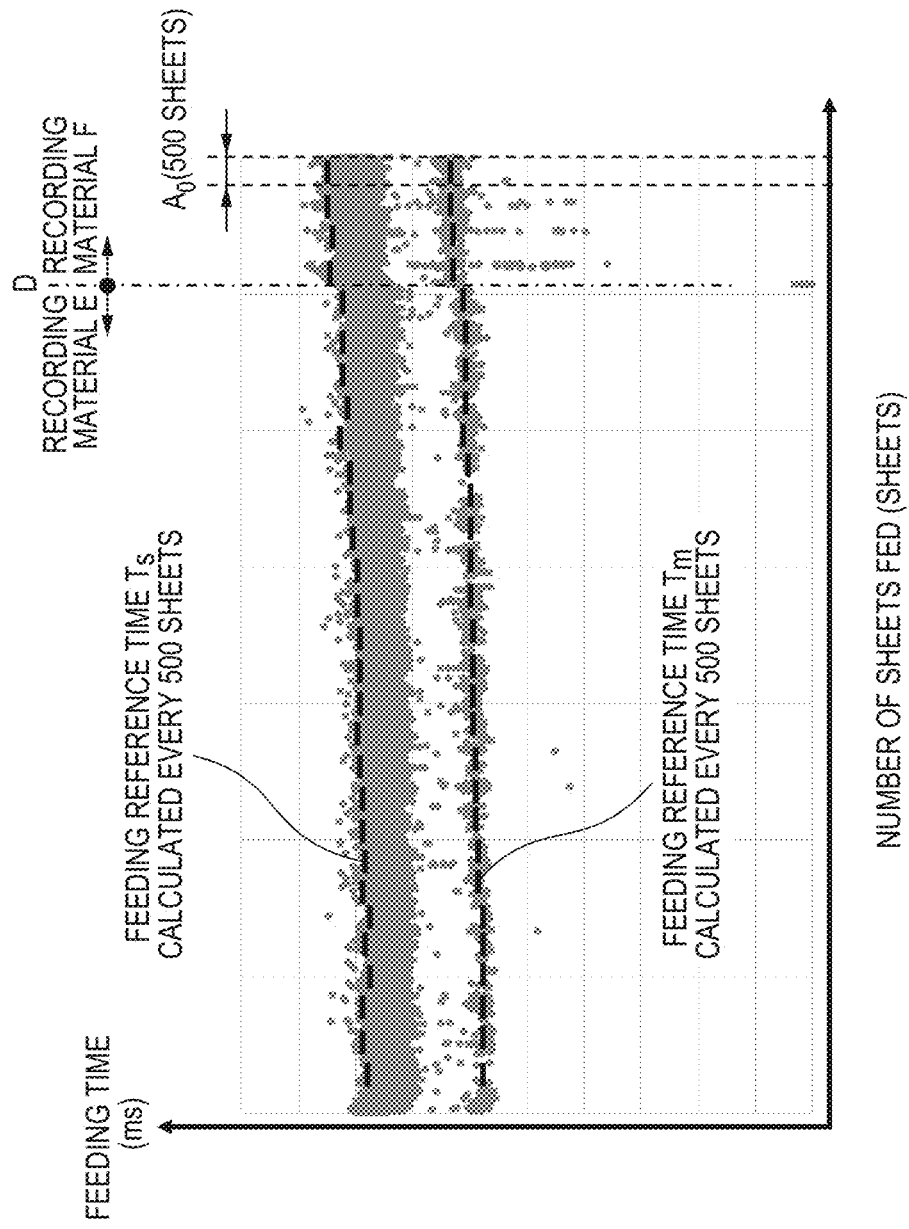
FIG. 26 is a graph indicating a relationship of the number of sheets fed and feeding time in the fifth and sixth embodiments.

FIG. 26 is a graph that indicates the transition of the feeding time that is related to the number of sheets fed which was monitored from the start of the use of the printer PR In continuing to use the printer PR, a roller friction coefficient changes subtly due to variability in the physical properties (surface property, grammage, rigidity, and the like) of the medium used at each time or the difference in the temperature and humidity of the usage environment. Therefore, feeding time changes irregularly. For example, how the tendency of the feeding time has changed by the type of the recording material S changing (changed from a recording material E to another type of a recording material F) can be confirmed at a timing D in FIG. 26. Note that the feeding reference time Ts and feeding reference time Tm will be described later in detail.

Generally, in a case where feeding is started from a state in which the leading edge of the recording material S is positioned at the separation nip portion Pn, the feeding time is shortened, and in a case where the feeding time is started from a state in which the leading edge of the recording material S is positioned at a set position Ps, the feeding time is lengthened. Because there is such a fundamental characteristic, irregular change in the feeding time within a predetermined range is not something that directly leads to feeding failure. Data that suddenly deviates outward in relation to data distribution (feeding time data that has changed beyond the predetermined range) may lead to feeding failure. Accordingly, a reference value of the feeding time that is suitable for the state at each time is statistically calculated and by considering the difference tendency in relation to the data that deviates suddenly, an evaluation of failure risk is performed.

[Description of Method for Calculating Reference Value]

Next, a method for calculating the reference value of feeding time will be described. Feeding time changes greatly in accordance with various factors such as a feeding inlet from where the recording material S is fed, the type of paper, environment, the status of the durability of the main body, and the method of setting paper by the user. Therefore, when calculating the reference value, it is necessary to calculate using collection data that is statistically sufficient for being able to guarantee reliability and whose feeding time is stable. It is preferred to utilize the most recent data in order to remove the durability factor and to utilize data from which portions whose variation amount is large has been removed. Also, a configuration may be taken so as to utilize information (for example, sheet type sensor, temperature/humidity sensor, cassette opening/closing history, paper remaining amount sensor, and the like) that is held by the main body and remove data that is in a section whose usage condition has changed.

Figure 27:
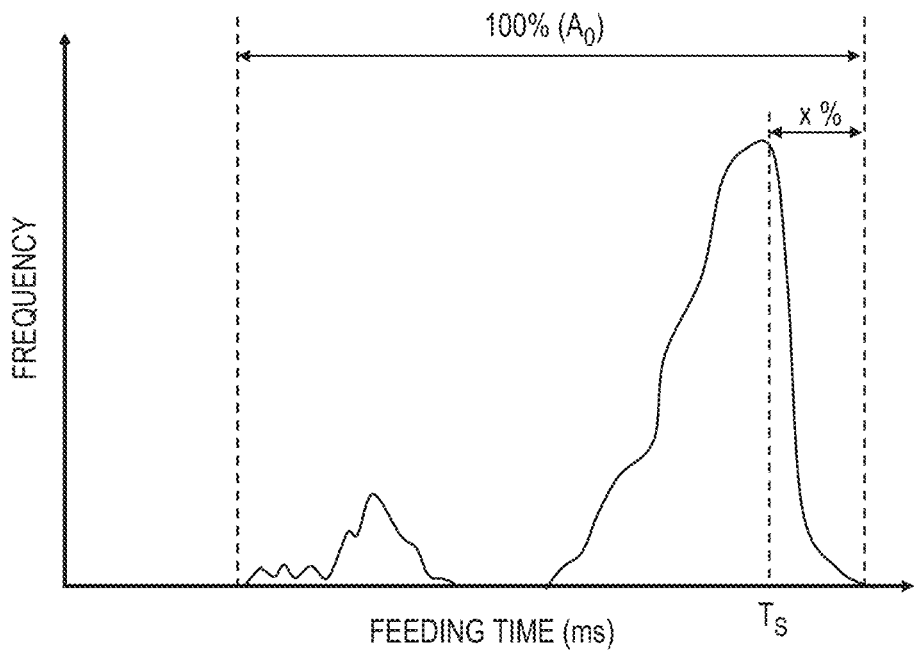
FIG. 27 is a graph indicating the frequency distribution of feeding times in the fifth embodiment.

FIG. 27 is a graph for representing the frequency distribution of the most recent 500 sheet of feeding time data. In the present embodiment, this feeding time data for 500 sheets is handled as one set of collection data A0 and the reference value is calculated. In other words, one set of reference value data is calculated (updated) for every 500 sheets from the start of use of the printer PR. Here, because the feeding time may change in accordance with the remaining amount of the recording material S that is accommodated in the accommodation cassette 21, correction processing in accordance with the remaining amount of the recording material S that is accommodated in the accommodation cassette 21 in advance may be performed in relation to the collection data A0. Hereinafter, the reason for this and specific correction method will be described.

When the remaining amount of the recording material S that is accommodated in the accommodation cassette 21 decreases, a space is formed between the recording material S that is positioned at the top and the feeding roller 22; therefore, it is necessary to cause the intermediate plate to rise in order to fill this space. As a method for raising the intermediate plate, a rotation method (method for lifting up the recording material S by rotating the intermediate plate) and a linear-motion method (method for lifting up the recording material S by moving the intermediate plate in a vertical direction) are known. Out of these, when a configuration of the rotation method is taken, there is a possibility that the feeding time may also be affected in conjunction with the intermediate plate being rotated.

Figure 28:
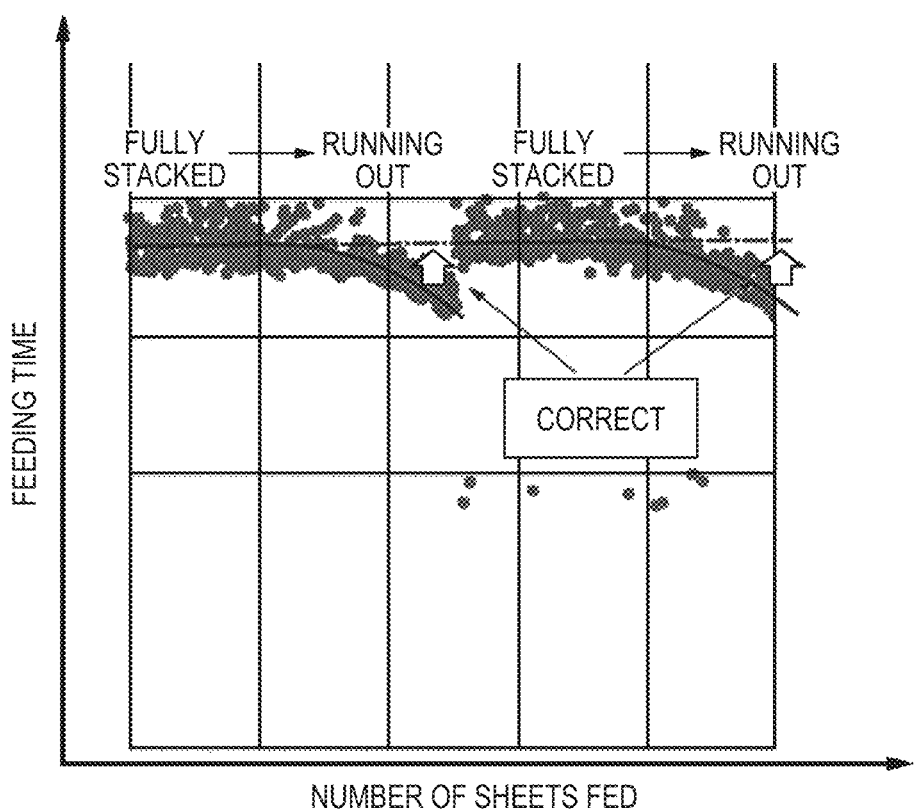
FIG. 28 is a graph indicating the effect of the remaining amount in the cassette on feeding times in the fifth embodiment.

In the configuration of the rotation method, there are two major factors that can be considered as the reason why the feeding time changes. The first factor is that the set position Ps (described in FIG. 25A to FIG. 25C) of the recording material S that is positioned at the top changes in conjunction with the intermediate plate being rotated. By the set position Ps deviating, the time it takes for the recording material S to arrive at the conveyance path sensor 27 changes. The second factor is that the orientation (slope) of the recording material S that is positioned at the top changes in conjunction with the intermediate plate being rotated. Because the angle at which the recording material S enters the conveyance path 41 changes when the orientation of the recording material S changes, the path that the recording material S takes from the separation nip portion Pn to a detection position Pr changes. The recording material S, when fully accommodated, is conveyed so that the leading edge of the recording material S follows the outer side (right side in FIG. 25A to FIG. 25C) of the conveyance path 41. Meanwhile, the recording materials S, when lightly accommodated, are conveyed so that the leading edge of the recording material S follows the inner side (left side in FIG. 25A to FIG. 25C) of the conveyance path 41. Considering the above factors, there is a tendency that, when the recording materials S are lightly accommodated in comparison to when it is fully accommodated, the feeding time is shorter. This situation is indicated in FIG. 28.

In the printer PR a mechanism that detects the remaining amount of the recording material S that is accommodated in the accommodation cassette 21 is comprised. Specifically, a paper surface sensor (not shown) that detects the surface of the recording material S that is accommodated in the accommodation cassette 21 is disposed in the printer PR and by the lift up time it takes for the paper surface sensor to detect the recording material S or the lift up driving amount being measured, the remaining amount can be detected. After the lift up, the remaining amount can be detected by the CPU 70 counting the number of sheets fed. In the present embodiment, correction processing is performed on the feeding time in accordance with the detected remaining amount. For example, when the recording materials S is fully accommodated, correction processing is not performed; when the remaining amount is from 20% to 40%, a correction time α is added to the measured feeding time; and when the remaining amount is from 0% to 20%, a correction time β (α<β) is added to the measured feeding time.

Note that as described above, when acquiring the collection data A0, it is preferred to utilize data from which portions whose variation amount is large has been removed; however, in a case where it is necessary to use data of a portion whose variation amount is large in order to acquire a sufficient number of samples, correction processing is applied on the collection data A0 in advance. For example, as described in FIG. 26, in a case where the type of the recording material S that is accommodated in the accommodation cassette 21 is changed from the recording material E to the recording material F, the feeding time is slower in general. Considering this effect, in a case where data in a case where the recording material E is fed and data in a case where the recording material F is fed are present among feeding data for 500 sheets, correction processing is performed so that a large difference will not arise between the two sets of data. Specifically, processing such as adding a correction time γ in relation to data in a case where the recording material E is fed, subtracting the correction time γ in relation to data in a case where the recording material F is fed, and the like is performed.

In the present embodiment, in a case where the recording material S is fed by the feeding mechanism 20, the possibility that slipping may occur is determined. Slipping refers to a situation in which, when the feeding roller 22 feeds the recording material S, frictional force does not work property, slipping occurs, and the timing to move the recording material S is delayed or the recording material S could not be moved. In the present embodiment, the feeding time when feeding is started from a state in which the leading edge of the recording material S1 is at the set position Ps in FIG. 25A to FIG. 25C is defined as the feeding reference time Ts (reference value). Then, an analysis is performed by extracting data that indicates time that is longer than this reference value.

In the frequency distribution in FIG. 27, the feeding reference time Ts is the top x % of values of the collection data A0 from which a portion of data that suddenly became slow is removed. In the present embodiment, after the distribution tendency of the feeding reference time Ts under various condition is confirmed, x=5%, which is a ratio in which the feeding reference time Ts could be acquired in a stable manner under all conditions, is set. Note that it is known from experimentation that x %, even when large, is 10% or less (within a range of a few percent to 10%).

[Method of Calculating Slip Index Value and Description of Method for Determining Possibility that Slipping May Occur]

Figure 29:
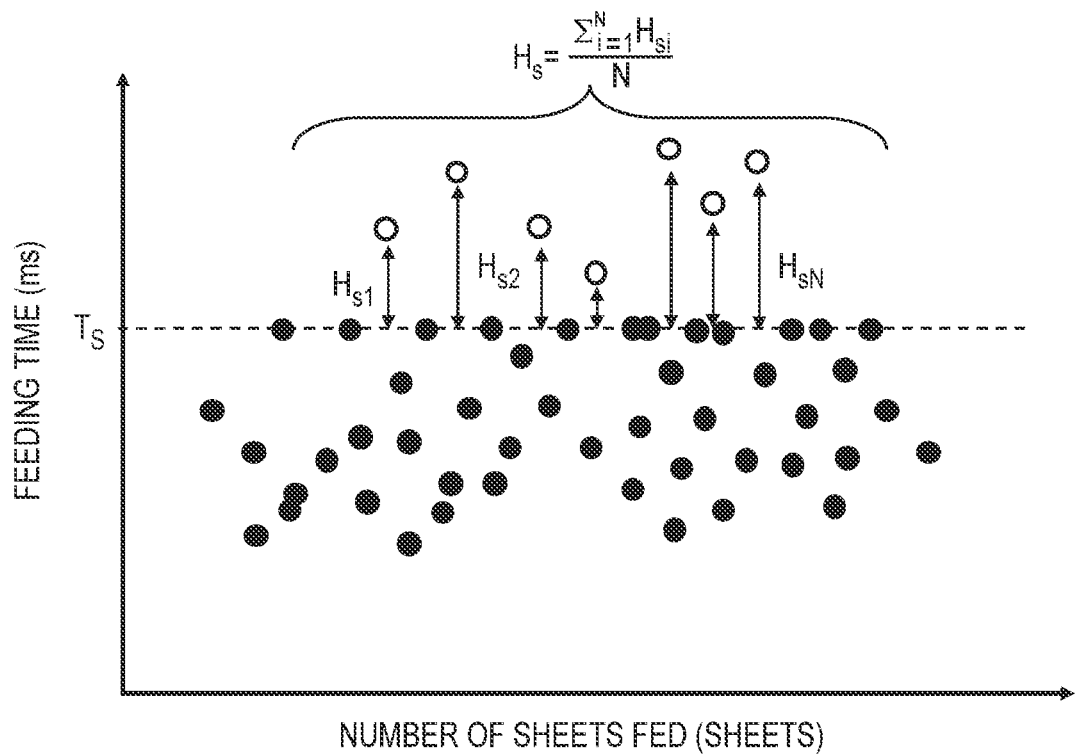
FIG. 29 is a graph indicating the relationship between the number of sheets fed and feeding times for describing the calculation method of a slip index value in the fifth embodiment.

Next, a method for calculating a slip index value HS using the reference value will be described using FIG. 29. FIG. 29 is a graph for indicating the relationship between the number of sheets fed and feeding time of the collection data A0. Note that here, in order to make the graph easier to view, not all of the data for 500 sheets have been plotted. The white circle data on the graph is data that indicates times (delayed data) that are longer than the feeding reference time Ts. When a tendency to slip in the feeding mechanism 20 due to durability transition, the state of the surface property of the recording material S, and the like starts to appear, the level of delay in the white circle data on the graph becomes larger. In view of this tendency, the average value of the absolute value of the differences from the feeding reference time Ts to the white circle data are set as the slip index value HS. In other words, the slip index value HS is obtained by the following expression.

$$H_S = \frac{\sum_{i=1}^{N} H_{Si}}{N} \qquad \text{Expression (7)}$$

Although here the absolute values of the differences were averaged as a method for quantifying the index value, other parameters such as a simple sum total of the absolute values of differences and a root mean square may be used. One of this slip index value HS is calculated for every feeding time data (collection data A0) for 500 sheets. Note that this slip index value HS is acquired by the CPU 70 that is included in the control unit 110.

Figure 30:
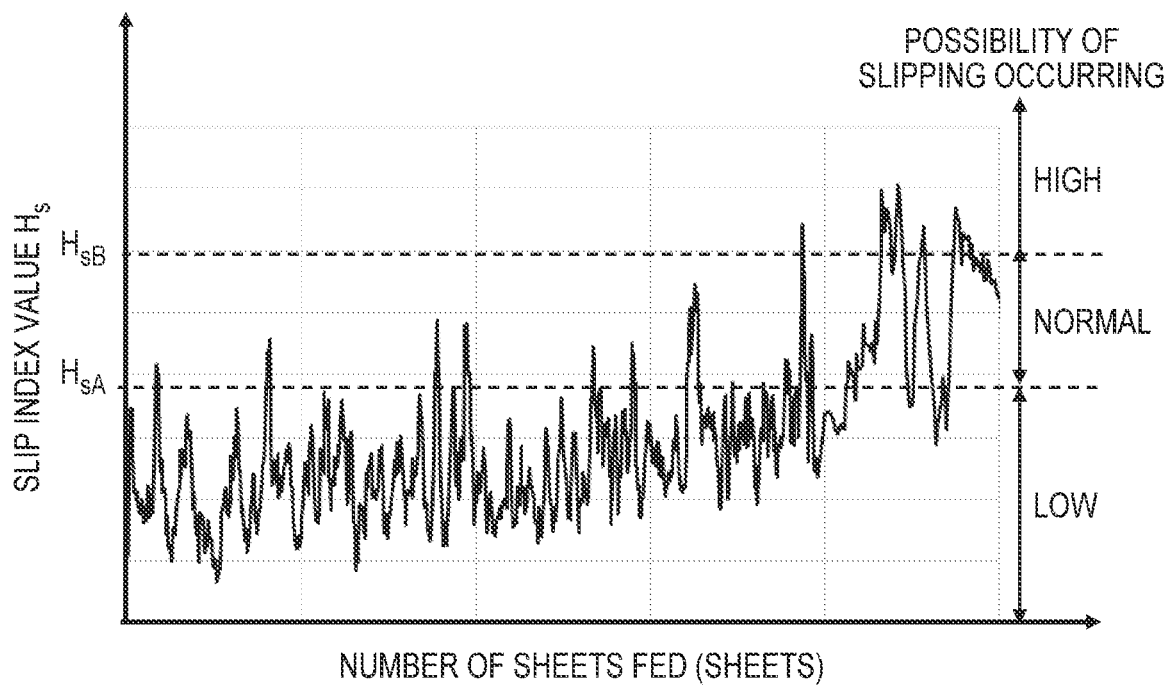
FIG. 30 is a graph indicating the relationship between the number of sheets fed and the slip index value in the fifth embodiment.

Next, a method for determining the possibility that slipping may occur will be described using FIG. 30. FIG. 30 is a result of calculating the slip index value HS for every 500 sheets from the start of the use of the printer PR made into a graph. It can be seen how the slip index value HS gradually becomes larger in accordance with the increase in the number of sheets fed. In the present embodiment, two thresholds, HSA and HSB are prepared and the possibility that slipping may occur is determined by the control unit 110 as follows.

HS≤HSA: Possibility that slipping may occur is low

HSA<HS≤HSB: Possibility that slipping may occur is normal

HSB<HS: Possibility that slipping may occur is high

Thresholds are not limited to the two, and three or more thresholds may be prepared in accordance with the intended use. The control unit 110 may notify the acquired determination result in relation to the user or the administrator who performs the maintenance management service of the printer PR. Note that, in a case where a notification is performed, the control unit 110 performs in real time the determination of which above state the feeding mechanism 20 is in and then performs notification in relation to the user or administrator each time. As the number of sheets fed increases, the feeding roller 22 is abraded, and if the possibility that slipping may occur is high, the frequency of notification will also increase.

Figure 31:
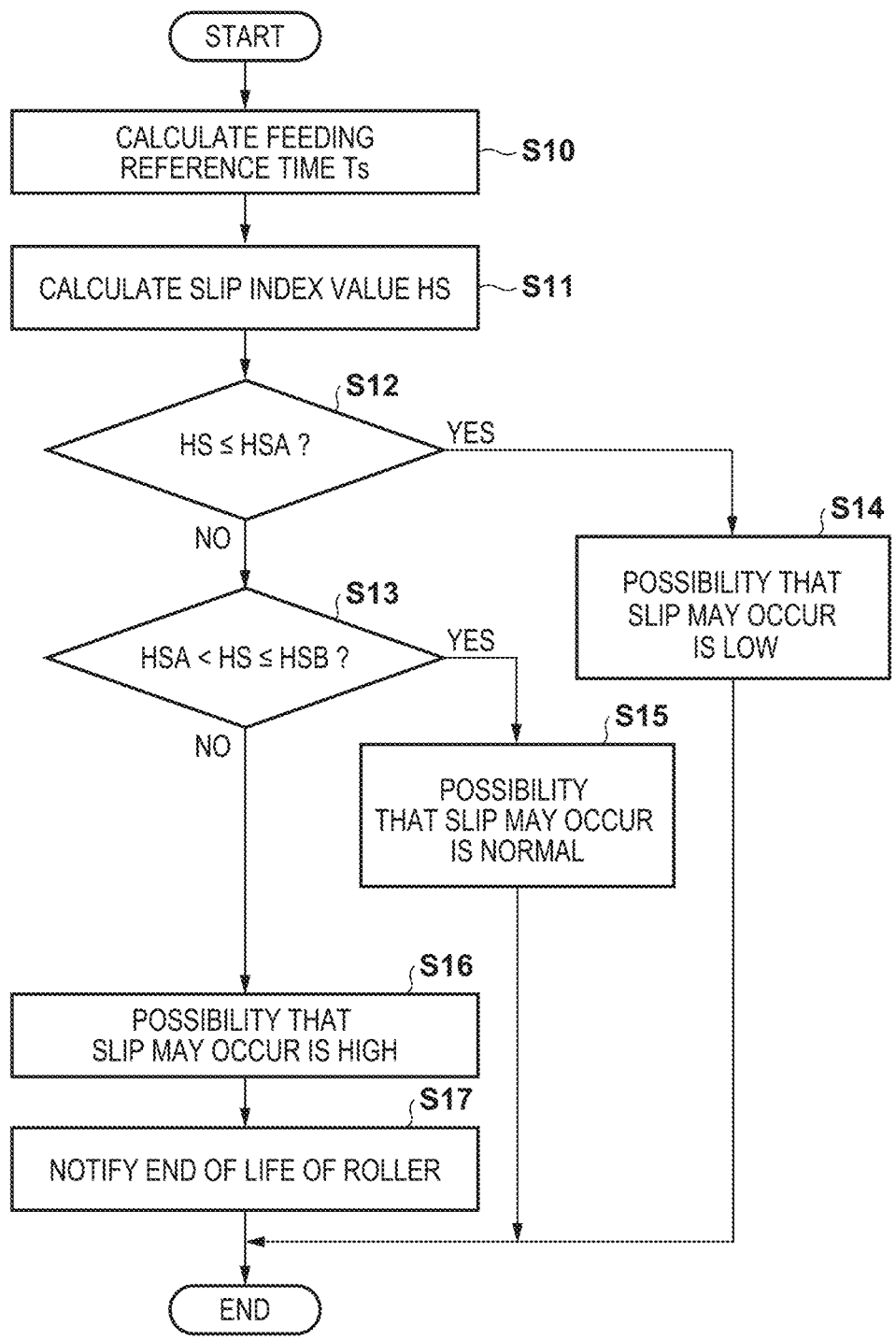
FIG. 31 is a flowchart for determining the possibility of slipping occurring in the fifth embodiment.

FIG. 31 is a flowchart for determining the possibility that slipping may occur in the present embodiment. The control based on FIG. 31 is executed by the CPU 70 based on a program that is stored in the ROM (not shown) and the like which are provided in the control unit 110. Note that the CPU 70 executes this control every time feeding time data (collection data A0) for 500 sheets is acquired.

First, the CPU 70 acquires the feeding reference time Ts which is the top x % of values of the collection data A0 (step S10). Next, the CPU 70 obtains the slip index value HS based on an expression described above (step S11). The CPU 70 compares the slip index value HS and the preset threshold HSA (step S12) and if the slip index value HS is equal to or less than the threshold HSA, the CPU 70 determines that, in case where the recording material S is fed by the feeding mechanism 20, the possibility that slipping may occur is low (step S14). In a case where the slip index value HS is greater than the threshold HSA, the CPU 70 next compares the slip index value HS and the preset threshold HSB (HSA<HSB) (step S13). If the slip index value HS is equal to or less than threshold HSB, the CPU 70 determines that, in a case where the recording material S is fed by the feeding mechanism 20, the possibility that slipping may occur is normal (step S15). If the slip index value HS is larger than threshold HSB, the CPU 70 determines that, in a case where the recording material S is fed by the feeding mechanism 20, the possibility that slipping may occur is high (step S16). In a case where the possibility that slipping may occur is determined to be high, the CPU 70 determines that the remaining life time of the feeding roller 22 that is included in the feeding mechanism 20 is running short and prompts the user or administrator via the operation display unit 80 to replace the feeding roller 22 (step S17).

Finally, the control of the present flowchart is ended.

By the above, by virtue of the present embodiment, it becomes possible to determine accurately the possibility that slipping may occur when the feeding unit feeds the recording material.

Note that, in the present embodiment, the CPU 70 determines the possibility that slipping may occur and in a case it determines that the possibility that slipping may occur is high, determines that the remaining life time of the feeding roller 22 is running short. However, the present invention is not limited to this. The CPU 70 may determine that the remaining life time of the feeding roller 22 is running short directly from the value of the slip index value HS without determining the possibility that slipping may occur. In other words, the CPU 70, in a case where the slip index value HS is greater than the threshold HSB, determines that the remaining life time of the feeding roller 22 is running short.

Sixth Embodiment

In the present embodiment, description will be given regarding a method for determining the possibility that the recording materials may be double fed during the feeding operation. The description of the main parts are the same as that of the fifth embodiment and here, only parts that are different from the fifth embodiment will be described.

[Description of Method for Calculating Reference Value]

In the present embodiment, in a case where the recording material S is fed by the feeding mechanism 20, the possibility that double feeding may occur is determined. Double feeding refers to a state in which the recording material S2 that is accommodated under the recording material S1 is picked up due to the friction that is generated between the recording material S2 and the recording material S1 during the feeding operation of the recording material S1 and then the leading edge of the recording material S2, in a state in which it is overlapping the recording material S1, goes past the separation nip portion Pn. In the present embodiment, the feeding time when feeding is started from a state in which the leading edge of the recording material S1 is at the separation nip portion Pn in FIG. 25A to FIG. 25C is defined as the feeding reference time Tm (reference value). Then, an analysis is performed by extracting data that indicates time that is shorter than this reference value.

Figure 32:
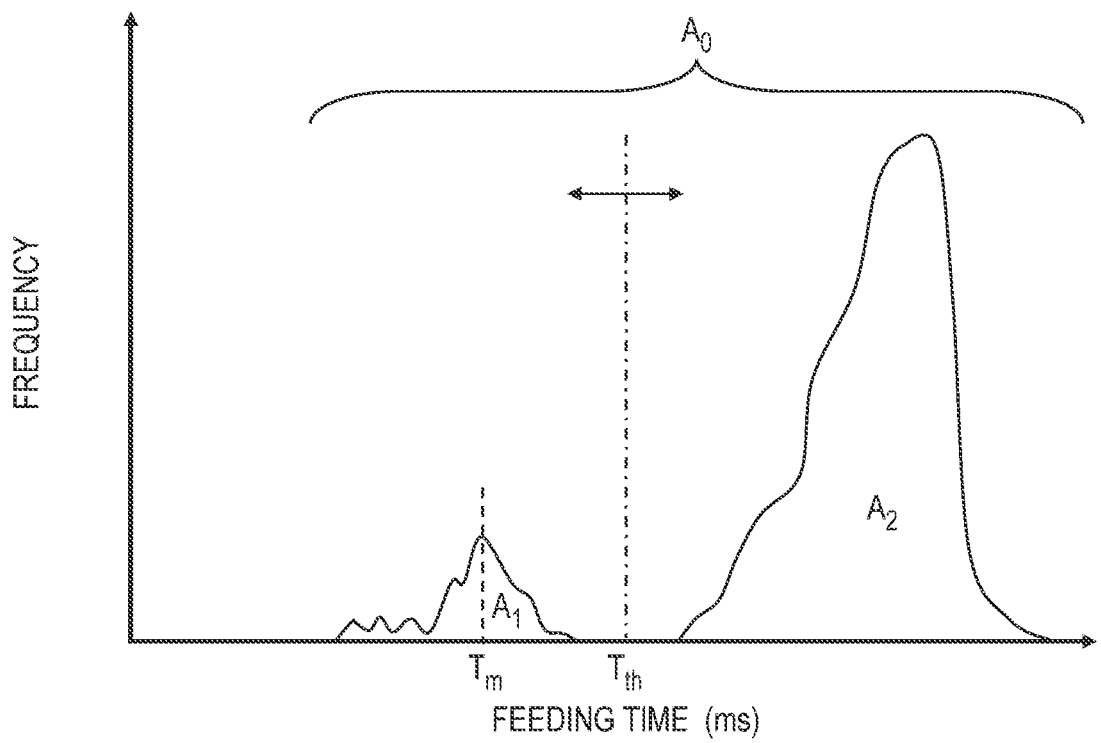
FIG. 32 is a graph view indicating a feeding time frequency distribution in a sixth embodiment.

A method for calculating the feeding reference time Tm is described using FIG. 32. FIG. 32 is a graph for representing the frequency distribution of feeding time data like FIG. 27. Here, similarly to in the fifth embodiment, because the feeding time may change in accordance with the remaining amount of the recording material S that is accommodated in the accommodation cassette 21, correction processing in accordance with the remaining amount of the recording material S that is accommodated in the accommodation cassette 21 in advance may be performed in relation to the collection data A0.

Here, when frequency distribution in FIG. 32 is viewed, it can be seen that the feeding time data is divided roughly into two groups. In view of the configuration of the feeding mechanism 20, the position of the leading edge of the recording material S that is accommodated in the accommodation cassette 21 has a high probability of being present at the set position Ps or the separation nip portion Pn. Also, in a state in which the leading edge of the recording material S is at the set position Ps, the distance from the leading edge of the recording material S to the conveyance path sensor 27 is longer in comparison to a state in which the leading edge of the recording material S is at the separation nip portion Pn. Therefore, a group (subset A1) whose length of time is shorter corresponds to the feeding time data in a state in which the leading edge of the recording material S1 is at the separation nip portion Pn. Also, a group (subset A2) whose length of time is longer corresponds to the feeding time data in a state in which the leading edge of the recording material S1 is at the separation nip portion Pn.

In the present embodiment, a data separation algorithm is applied in relation to the collection data A0 and only the configuration data of a subset A1 is extracted. In the present embodiment, separation processing is performed using a Gaussian mixture model. The Gaussian mixture model is a model that approximates data by superimposing a plurality of Gaussian distribution (normal distribution). Note that other clustering methods such as a k-means method may be used. In the extracted subset A1, due to the characteristics of the feeding mechanism 20, the peak of the distribution appears at the feeding time that corresponds to a state in which the leading edge of the recording material S is at the separation nip portion Pn where the succeeding paper that was picked up is obstructed and stopped. The possibility that double feeding may occur needs to be determined using the feeding time data of the recording material S which was not obstructed or stopped at the separation nip portion Pn; therefore, the feeding time (feeding time whose frequency is the highest) of the peak of the distribution of the subset A1 is set to the feeding reference time Tm. Note that although this time, the feeding reference time Tm is set to the peak of the distribution of the subset data A1, it may be the average value or the median value of the feeding time data that is included in the subset A1.

[Method of Calculating Double Feeding Index Value and Description of Method for Determining Possibility that Double Feed May Occur]

Figure 33:
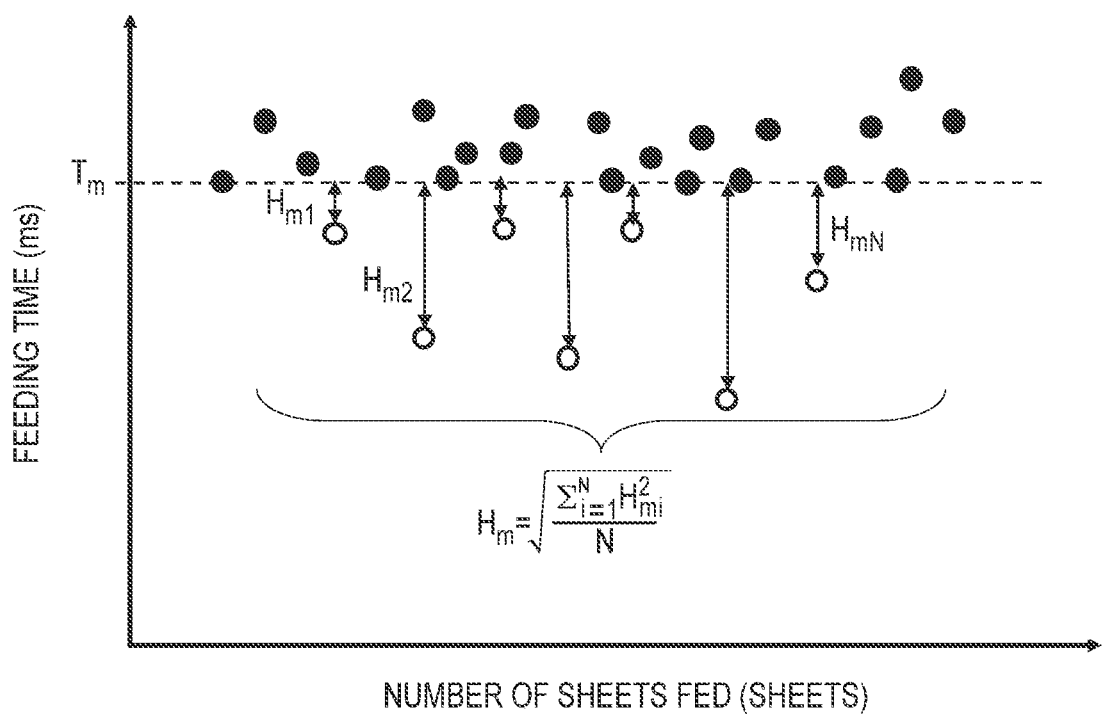
FIG. 33 is a graph indicating the relationship between the number of sheets fed and feeding times for describing the calculation method of a double-feed index value in the sixth embodiment.

Next, a method for calculating a double feeding index value Hm using the reference value will be described using FIG. 33. FIG. 33 is a graph for indicating the relationship between the number of sheets fed and feeding time of the collection data A0. Note that here, in order to make the graph easier to view, not all of the data for 500 sheets have been plotted. The white circle data (early arrival data) on the graph is data that indicates times that are shorter than the feeding reference time Tm. When a tendency to double feed in the feeding mechanism 20 due to durability transition, state of the surface property of the recording material, and the like starts to appear, occurrence frequency of cases in which the succeeding sheets are not obstructed or stopped at the separation nip portion Pn increases. Therefore, the number of white circle data on the graph increases and the difference from the feeding reference time Tm also increases. In view of this tendency, the root mean square of the differences from the feeding reference time Tm to the white circle data are set as the double feeding index value Hm. In other words, the double feeding index value Hm is obtained by the following expression.

$$H_m = \sqrt{\frac{\sum_{i=1}^{N} H_{mi}^2}{N}} \quad \text{Expression (8)}$$

Although here the absolute values of the differences were averaged as a method for quantifying the index value, other parameters such as a simple sum total of the absolute values of differences and a root mean square may be used. One of this double feeding index value Hm is calculated for every feeding time data (collection data A0) for 500 sheets. Note that this double feeding index value Hm is acquired by the CPU 70 that is included in the control unit 110.

Figure 34:
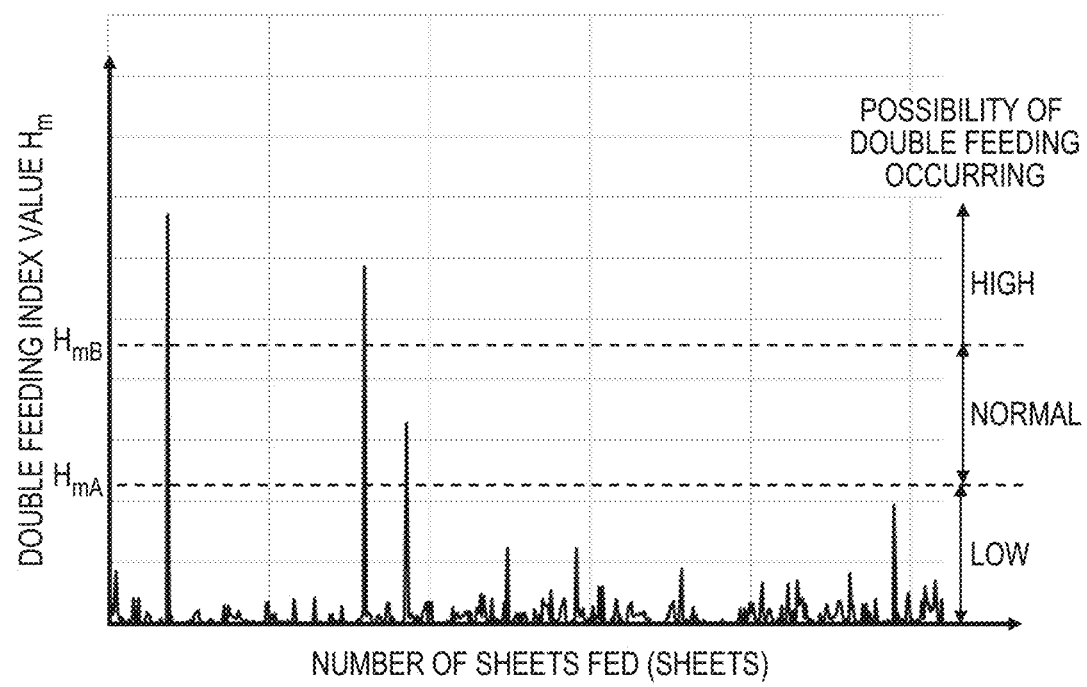
FIG. 34 is a graph indicating a relationship of the number of sheets fed and a double-feed index value in the sixth embodiment.

Next, a method for determining the possibility that double feeding may occur will be described using FIG. 34. FIG. 34 is a result of calculating the double feeding index value Hm for every 500 sheets from the start of the use of the printer PR made into a graph. In the present embodiment, two thresholds, HmA and HmB are prepared and the possibility that double feeding may occur is determined by the control unit 110 as follows.

Hm≤HmA: Possibility that double feeding may occur is low

HmA<Hm≤HmB: Possibility that double feeding may occur is normal

HmB<Hm: Possibility that double feeding may occur is high

Thresholds are not limited to the two, and three or more thresholds may be prepared in accordance with the intended use. The control unit 110 may notify the acquired determination result in relation to the user or the administrator who performs the maintenance management service of the printer PR. Note that the double feeding index value Hm as indicated in FIG. 34 is different from the slip index value Hs in the fifth embodiment and does not worsen as the durability progresses. The double feeding index value Hm is highly dependent on the surface property (frictional coefficient) of the recording material S and it is known that this surface property is different between the types of the recording material S, of course, and is also different between the lots and books of paper even if the type of paper is the same. By mainly notifying the dealer of such information, it becomes possible for the dealer to provide a better quality service such as introducing a different type of the recording material S for the user who is using the printer PR under an environment in which double feeding is likely to occur.

Figure 35:
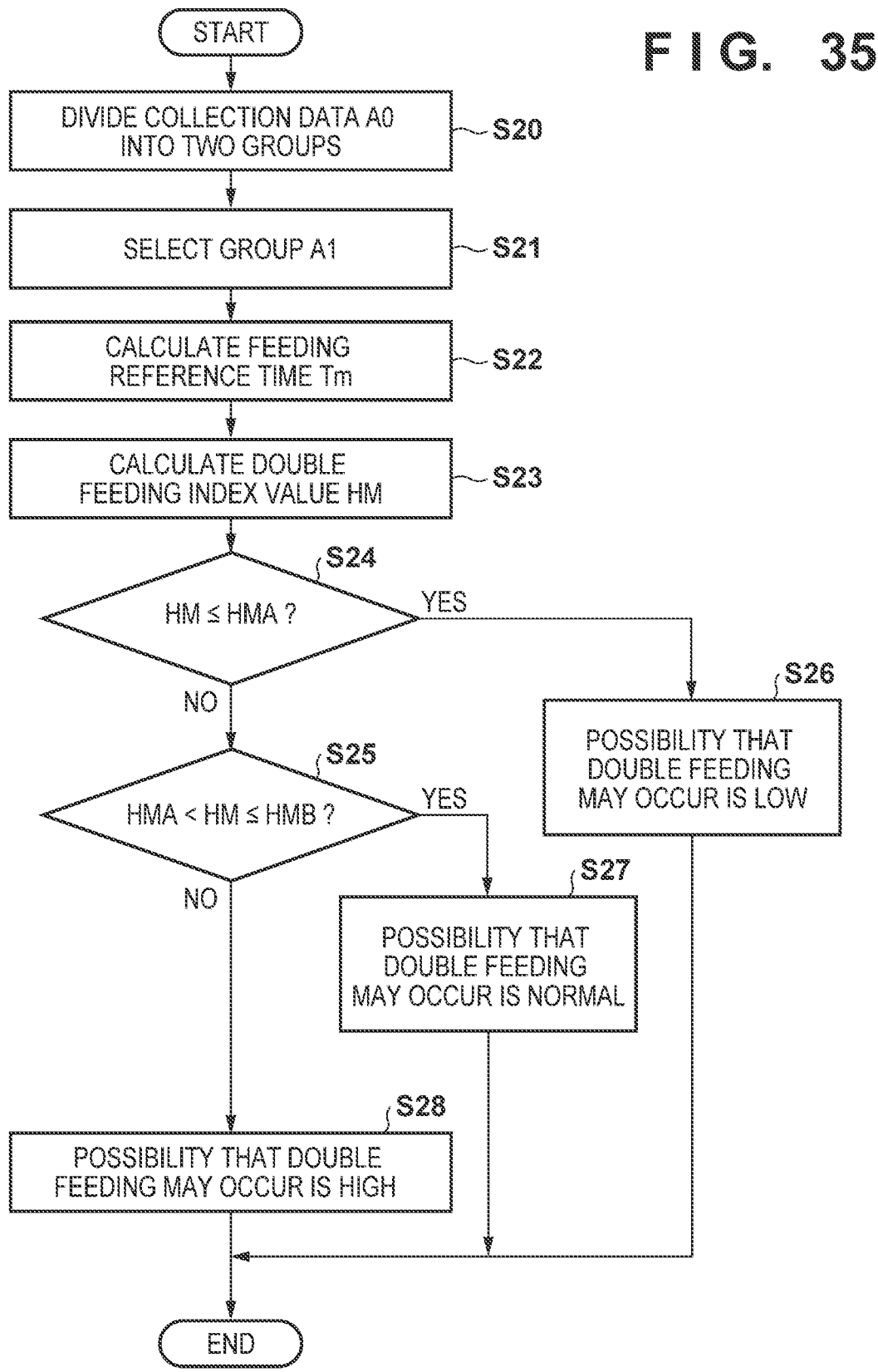
FIG. 35 is a flowchart for determining the possibility of double feeding occurring in the sixth embodiment.

FIG. 35 is a flowchart for determining the possibility of double feeding occurring in the present embodiment. The control based on FIG. 35 is executed by the CPU 70 based on a program that is stored in the ROM (not shown) and the like which are provided in the control unit 110. Note that the CPU 70 executes this control every time feeding time data (collection data A0) for 500 sheets is acquired.

First, the CPU 70 divides the collection data A0 into two groups (subsets A1 and A2) (step S20). The CPU 70 selects the group whose time is shorter (subset A1) among the two groups (step S21). Then, the CPU 70 obtains the feeding reference time Tm from the feeding time data that is included in the group whose time is shorter (step S22). Next, the CPU 70 obtains a double feeding index value Hm based on an expression described above (step S23). The CPU 70 compares the double feeding index value Hm and the preset threshold HmA (step S24) and if the double feeding index value Hm equal to or less than the threshold HmA, the CPU 70 determines that, in case where the recording material S is fed by the feeding mechanism 20, the possibility that double feeding may occur is low (step S26). In a case where the double feeding index value Hm is greater than the threshold HmA, the CPU 70 next compares the double feeding index value Hm and the preset threshold Hm (HmA<HmB) (step S25). If the double feeding index value Hm is equal to or less than threshold HmB, the CPU 70 determines that, in a case where the recording material S is fed by the feeding mechanism 20, the possibility that double feeding may occur is normal (step S27). In a case where the double feeding index value Hm is larger than threshold HmB, the CPU 70 determines that, in a case where the recording material S is fed by the feeding mechanism 20, the possibility that double feeding may occur is high (step S28). Finally, the control of the present flowchart is ended. Note that as described above, the double feeding index value Hm does not worsen as the durability progresses; therefore, in the present embodiment, in a case where it is determined that the possibility that double feeding may occur is high, the end of the life of the roller is not notified by the CPU 70.

By the above, by virtue of the present embodiment, it becomes possible to determine accurately the possibility that double feeding may occur when the feeding unit feeds the recording material.

Note that the possibility that slipping may occur and the possibility that double feeding may occur are being determined in the above fifth and sixth embodiments, respectively; however, a configuration may be taken so that the possibility that slipping may occur and the possibility that double feeding may occur may both be determined and then notified together to the user or dealer.

[Variation]

In the above first to sixth embodiments, the feeding mechanism 20 had the feeding roller 22, the conveyance roller 23, and the separation roller 24. However, the present invention is not limited to this. For example, a configuration may be taken so as to dispose one feeding roller, whose size is larger in comparison to the feeding roller 22, in which a first position on its surface contacts the recording material S that is accommodated in the feeding cassette 21 and a second position on its surface forms a separation nip portion with the separation roller 24. In other words, the conveyance roller 23 is unnecessarily according to this configuration.

Also, although in the above first to sixth embodiments, the counting of the feeding time was started from the timing when the feeding roller 22 started the feeding of the recording material S, the present invention is not limited to this. For example, a configuration may be taken so that a new sensor is disposed at a position that is different from the conveyance path sensor 27 and the counting of the feeding time is started from the timing when that new sensor has detected the recording material S. Alternatively, a configuration may be taken so that the counting of the feeding time is started from the timing that the recording material S is detected by the conveyance path sensor 27 and the counting of the feeding time is ended at the timing that the recording material S is detected by the new sensor.

Also, although in the above fifth embodiment, the feeding reference time Ts is extracted as the top x % values of the collection data A0, the present invention is not limited to this. Similarly to the sixth embodiment, a configuration may be taken so as to divide the collection data A0 into two groups (subsets A1 and A2), select the group A2 whose time is longer, and then acquire the feeding reference time Ts. Specifically, similarly to the method that was described in the sixth embodiment, the feeding time (feeding time whose frequency is the highest) of the peak of the distribution of the group A2 may be set as the feeding reference time Ts or the average value or the median value of the feeding time data that is included in the group A2 may be set as the feeding reference time Ts.

Also, although in the above sixth embodiment, the feeding reference time Tm is extracted from the feeding time data included in the group A1, the present invention is not limited to this. Similarly to the fifth embodiment, the feeding reference time Tm may be acquired as the bottom y % values of the collection data A0. A smaller value than x % needs to be set for y %, and according to experimentation, it is desirable to set a value from 1% to 2%.

Also, in the above fifth and sixth embodiments, the possibility that an abnormal state may occur when the feeding mechanism 20 feeds the recording material S is determined; however, the present invention may also be applied to a location besides the feeding mechanism 20. For example, by monitoring the feeding time between desired two points that on the conveyance path 41 positioned further on the downstream side than the feeding mechanism 20, it becomes possible to determine the possibility that a sudden slip may occur due to a change in conveyance load which may occur when the recording material S passes that section.

Also, although in the above fifth and sixth embodiments, the feeding time is utilized as the processing data for determining the possibility that the abnormal state may occur, the present invention is not limited to this. For example, the driving amount by the motor (actuator) that drives the feeding roller 22 or the conveyance roller 23 may be utilized as the processing data. As the reference amount, the driving amount data which will be the reference in place of the feeding reference time Ts and the feeding reference time Tm is obtained, a total sum of the absolute values of the differences and the like is obtained in the same method as described in the fifth and second embodiments, and then the result is compared with the threshold. If the driving amount is utilized as the processing data, it is possible to support cases in which control for switching the conveyance speed of the recording material S is performed after the recording material S is fed by the feeding roller 22.

Also, although in the above fifth and sixth embodiments, the CPU 70 that is disposed in the printer PR determines the possibility that an abnormal state such as slipping or double feeding may occur, the present invention is not limited to this. As the configuration that was described in the first to fourth embodiments, a configuration may be taken so as to determine the possibility that an abnormal state may occur by exchanging information between the image forming apparatus 100 and the server 410. Specifically, a configuration may be taken so that the CPU 70 transmits the feeding time data to the server that is connected with the printer PR and then the CPU that is disposed on the server executes the flowchart that is indicated in FIGS. 31 and 35.

Other Embodiments

By virtue of the present invention, by predicting the remaining life time of the feeding unit based on the usage state of the feeding unit, there is the effect of being able to ascertain the replacement timing of the feeding unit at an early stage.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-224024, filed Dec. 11, 2019, Japanese Patent Application No. 2020-104674, filed Jun. 17, 2020 and Japanese Patent Application No. 2020-196336, filed Nov. 26, 2020 which are hereby incorporated by reference herein in their entirety.

What is claimed is:
1. An image forming system comprising:
an information processing apparatus; and
an image forming apparatus, wherein
the image forming apparatus comprises:
   an accommodating tray configured to accommodate a recording material;
   a feeding rotation member configured to feed a recording material accommodated in the accommodating tray;
   a detection sensor configured to detect a recording material fed by the feeding rotation member;
   one or more first hardware processors;
   one or more first memories including first instructions, that when executed by the one or more first hardware processors, cause the image forming apparatus to function as:
      a measuring unit configured to measure time from a predetermined timing until the detection sensor detects the recording material, and
the information processing apparatus comprises;
   one or more second hardware processors;
   one or more second memories including second instructions, that when executed by the one or more second hardware processors, cause the information processing apparatus to function as:

a reception unit configured to receive time data obtained by the measuring unit from the image forming apparatus;

a classification unit configured to classify a plurality of the time data received by the reception unit into a first group and a second group in accordance with a length of time; and a selection unit configured to select a group for predicting a remaining life time of the feeding rotation member from the first group and the second group that are classified by the classification unit; and a prediction unit configured to predict a remaining life time of the feeding rotation member using the time data included in the group selected by the selection unit.

2. The image forming system according to claim 1, wherein the selection unit selects the first group whose the time data is greater than the second group.

3. The image forming system according to claim 1, wherein the prediction unit predicts a remaining life time of the feeding rotation member by using a linear regression model on the time data included in a group selected by the selection unit.

4. The image forming system according to claim 1, wherein the second instructions, when executed by the one or more second hardware processors, cause the information processing apparatus to further function as:
a reliability determination unit configured to determine a reliability of each of the first group and the second group classified by the classification unit, and
the selection unit selects a group whose reliability is determined to be high by the reliability determination unit.

5. The image forming system according to claim 4, wherein the reliability determination unit determines reliability of each set of the first group and the second group based on variance and the number of the time data of each of the first group and the second group classified by the classification unit.

6. The image forming system according to claim 5, wherein the reliability determination unit, in a case where the variance is less than a predetermined value and the number of the time data is greater than a predetermined number, determines that reliability is high.

7. The image forming system according to claim 1, wherein the second instructions, when executed by the one or more second hardware processors, cause the information processing apparatus to further function as:
a tendency change determination unit configured to determine a tendency change in a plurality of the time data received by the reception unit, and
the classification unit classifies time data from a point in time when it is determined that there is the tendency change in the time data by the tendency change determination unit onwards into the first group and the second group.

8. The image forming system according to claim 7, wherein the tendency change determination unit, in a case where the amount of a change in an average value of the time data within a predetermined time is greater than a preset value in a plurality of the time data received by the reception unit, determines that there is the tendency change.

9. The image forming system according to claim 1, wherein the first instructions, when executed by the one or more first hardware processors, cause the image forming apparatus to further function as:
a sensing unit configured to sense an amount of recording material accommodated in the accommodating tray; and
a correction unit configured to correct the time data obtained by the measuring unit in accordance with an amount of the recording material sensed by the sensing unit.

10. The image forming system according to claim 9, wherein the sensing unit includes
a lift unit configured to lift a recording material accommodated in the accommodating tray; and
a recording material detection sensor configured to detect the recording material lifted by the lift unit, and
an amount of the recording material accommodated in the accommodating tray is sensed based on time from when lifting of the recording material is started by the lift unit until the recording material detection sensor detects the recording material.

11. The image forming system according to claim 1, wherein the feeding rotation member includes a feeding member for feeding a recording material accommodated in the accommodating tray, a conveyance member for conveying a recording material fed by the feeding member, and a separation member that forms a separation nip portion with the conveyance member and is for separating a plurality of recording materials into single sheets.

12. The image forming system according to claim 1, wherein the measuring unit measures time from a recording material feeding start timing by the feeding rotation member until the detection sensor detects the recording material.

13. The image forming system according to claim 1, wherein the first instructions, when executed by the one or more first hardware processors, cause the image forming apparatus to further functions as:
a display unit for displaying information, and
in a case where the prediction unit predicts that a remaining life time of the feeding rotation member is decreasing, the display unit displays information that indicates that the remaining life time of the feeding rotation member is decreasing.

14. The image forming system according to claim 1, wherein the second instructions, when executed by the one or more second hardware processors, cause the information processing apparatus to further function as:
an acquisition unit configured to acquisition unit from a plurality of time data included in a group selected by the selection unit a reference time for predicting a remaining life time of the feeding rotation member, and
the prediction unit predicts the remaining life time of the feeding rotation member based on the plurality of time data included in the group selected by the reference time.

15. The image forming system according to claim 14, wherein the accommodating tray includes a regulating plate that regulates a trailing edge of a recording material in a feeding direction of recording materials, and
the reference time acquired by the acquisition unit, in a case where a trailing edge of the recording material is positioned by the regulating plate and a recording material is fed from a state in which a recording material is accommodated in the accommodating tray, corresponds to the time measured by the measuring unit.

16. The image forming system according to claim 14, wherein the reference time is a time whose frequency is the highest among the plurality of time data included in the first group whose time data is greater than the second group.

17. The image forming system according to claim 14, wherein the reference time is an average value or a median value of the plurality of time data included in the first group whose time data is greater than the second group.

18. The image forming system according to claim 14, wherein the prediction unit predicts a remaining life time of the feeding rotation member based on the reference time and time data that is longer than the reference time among the plurality of time data included in the selected group.

19. The image forming system according to claim 18, wherein the prediction unit obtains an absolute value of a difference between the reference time and each of time data that is longer than the reference time, and predicts that the more the remaining life time of the feeding rotation member has decreased, the larger a sum total of the absolute value of the differences is.

20. An image forming apparatus, comprising:
an accommodating tray configured to accommodate a recording material;
a feeding rotation member configured to feed a recording material accommodated in the accommodating tray;
a detection sensor configured to detect a recording material fed by the feeding rotation member;
one or more hardware processors; and
one or more memories including instructions, that when executed by the one or more hardware processors, cause the image forming apparatus to function as:
a measuring unit configured to measure time from a predetermined timing until the detection sensor detects the recording material;
a classification unit configured to classify a plurality of time data obtained by the measuring unit into a first group and a second group in accordance with a length of time;
a selection unit configured to select a group for predicting a remaining life time of the feeding rotation member from the first group and the second group that are classified by the classification unit; and
a prediction unit configured to predict a remaining life time of the feeding rotation member using the time data included in the group selected by the selection unit.

21. A feeding apparatus, comprising:
an accommodating tray configured to accommodate a recording material;
a feeding rotation member configured to feed a recording material accommodated in the accommodating tray;
a detection sensor configured to detect a recording material fed by the feeding rotation member;
one or more hardware processors; and
one or more memories including instructions, that when executed by the one or more hardware processors, cause the feeding apparatus to function as:
a measuring unit configured to measure time from a predetermined timing until the detection sensor detects the recording material;
an acquisition unit configured to divide a plurality of time data obtained by the measuring unit into two groups in accordance with a length of time and acquire from the plurality of time data included in a selected group among the two groups a reference time for determining a possibility that an abnormal state may occur when a recording material is fed by the feeding rotation member; and
a determination unit configured to determine a possibility that the abnormal state may occur based on the reference time and the plurality of time data included in the selected group.

22. The feeding apparatus according to claim 21, wherein the accommodating tray includes a regulating plate that regulates a trailing edge of a recording material in a feeding direction of recording materials, and
the reference time acquired by the acquisition unit, in a case where a trailing edge of the recording material is positioned by the regulating plate and a recording material is fed from a state in which the recording material is accommodated in the accommodating tray, corresponds to the time obtained by the measuring unit.

23. The feeding apparatus according to claim 21, wherein the reference time is a time whose frequency is the highest among the plurality of time data included in the group whose length of time is greater among the two groups.

24. The feeding apparatus according to claim 21, wherein the reference time is an average value or a median value of the plurality of time data included in the group whose length of time is greater among the two groups.

25. The feeding apparatus according to claim 21, wherein the determination unit, based on the reference time and time data that is longer than the reference time among the plurality of time data included in the selected group, determines the possibility that an abnormal state may occur.

26. The feeding apparatus according to claim 25, wherein the determination unit obtains an absolute value of a difference between the reference time and each of time data that is longer than the reference time, and determines that the higher the possibility that an abnormal state may occur is, the larger a sum total of the absolute value of the differences is.

27. The feeding apparatus according to claim 21, wherein the abnormal state is a state in which a recording material is delayed due to slipping.

28. The feeding apparatus according to claim 21, wherein the reference time to be acquired by the acquisition unit, in a case where a recording material is fed from a state in which a leading edge of a recording material in a feeding direction of recording materials is at a separation nip portion, corresponds to the time measured by the measuring unit.

29. The feeding apparatus according to claim 21, wherein the reference time is a time whose frequency is the highest among a frequency distribution of the plurality of time data included in the group whose length of time is shorter among the two groups.

30. The feeding apparatus according to claim 21, wherein the reference time is an average value or a median value of the plurality of time data included in the group whose length of time is shorter among the two groups.

31. The feeding apparatus according to claim 21, wherein the determination unit, based on the reference time and time data that is shorter than the reference time among the plurality of time data included in the selected group, determines the possibility that an abnormal state may occur.

32. The feeding apparatus according to claim 31, wherein the determination unit obtains an absolute value of a difference between the reference time and each of time data that is shorter than the reference time, and determines that the higher the possibility that an abnormal state may occur is, the larger a sum total of the absolute value of the differences is.

33. The feeding apparatus according to claim 21, wherein the abnormal state is a state in which a plurality of recording materials are not separated into single sheets at a separation nip portion.

34. The feeding apparatus according to claim 21, wherein the acquisition unit updates the reference time every time the feeding rotation member feeds a predetermined number of recording materials.

35. The feeding apparatus according to claim 21, wherein the predetermined timing is a timing when a feeding member starts feeding of the recording material.

36. The feeding apparatus according to claim 21, wherein the feeding rotation member includes a feeding member for feeding a recording material accommodated in the accommodating tray, a conveyance member for conveying a recording material fed by the feeding member, and a separation member that forms a separation nip portion with the conveyance member and is for separating a plurality of recording materials into single sheets.

37. A feeding apparatus, comprising:
an accommodating tray configured to accommodate a recording material;
a feeding rotation member configured to feed a recording material accommodated in the accommodating tray;
a detection sensor configured to detect a recording material conveyed by the feeding rotation member;
one or more hardware processors; and
one or more memories including instructions, that when executed by the one or more hardware processors, cause the feeding apparatus to function as:
a driver unit configured to drive the feeding rotation member;
a measuring unit configured to measure a driving amount by the driver unit from a predetermined timing until the detection sensor detects a recording material;
an acquisition unit configured to divide a plurality of driving amount data obtained by the measuring unit into two groups in accordance with a size of a driving amount and acquire from the plurality of driving amount data included in a selected group among the two groups a reference amount for determining a possibility that an abnormal state may occur when a recording material is fed by the feeding rotation member; and
a determination unit configured to determine a possibility that the abnormal state may occur based on the reference amount and the plurality of driving amount data included in the selected group.

* * * * *